(12) United States Patent
Sherman et al.

(10) Patent No.: US 11,685,983 B2
(45) Date of Patent: Jun. 27, 2023

(54) HIGH CONDUCTIVITY MAGNESIUM ALLOY

(71) Applicant: Terves, LLC, Euclid, OH (US)

(72) Inventors: Andrew J. Sherman, Mentor, OH (US); Nicholas Farkas, Euclid, OH (US)

(73) Assignee: TERVES, LLC, Euclid, OH (US)

( * ) Notice: Subject to any disclaimer, the term of this patent is extended or adjusted under 35 U.S.C. 154(b) by 708 days.

(21) Appl. No.: 16/504,621

(22) Filed: Jul. 8, 2019

(65) Prior Publication Data

US 2019/0338405 A1 Nov. 7, 2019

Related U.S. Application Data

(60) Division of application No. 15/601,451, filed on May 22, 2017, now abandoned, which is a
(Continued)

(51) Int. Cl.
*C23F 1/06* (2006.01)
*C22C 23/00* (2006.01)
(Continued)

(52) U.S. Cl.
CPC ............... *C22F 1/06* (2013.01); *B22D 19/14* (2013.01); *B22D 21/007* (2013.01); *B22D 21/04* (2013.01);
(Continued)

(58) Field of Classification Search
CPC ............ C22F 1/06; B22D 19/14; C23C 22/00
See application file for complete search history.

(56) References Cited

U.S. PATENT DOCUMENTS 3,180,728 A 4/1965 Pryor et al.
3,445,731 A 5/1969 Saeki et al.
(Continued)

FOREIGN PATENT DOCUMENTS

CA 2886988 10/2015
CN 101381829 3/2009
(Continued)

OTHER PUBLICATIONS

Scharf et al., "Corrosion of AX 91 Secondary Magnesiunm Alloy", Advanced Engineering Materials, vol. 7, No. 12, pp. 1134-1142 (2005).
(Continued)

*Primary Examiner* — Lois L Zheng
(74) *Attorney, Agent, or Firm* — Ulmer & Berne LLP; Brian E Turung

(57) ABSTRACT

A castable, moldable, or extrudable magnesium-based alloy that includes one or more insoluble additives. The insoluble additives can be used to enhance the mechanical properties of the structure, such as ductility and/or tensile strength. The final structure can be enhanced by heat treatment, as well as deformation processing such as extrusion, forging, or rolling, to further improve the strength of the final structure as compared to the non-enhanced structure. The magnesium-based composite has improved thermal and mechanical properties by the modification of grain boundary properties through the addition of insoluble nanoparticles to the magnesium alloys. The magnesium-based composite can have a thermal conductivity that is greater than 180 W/m-K, and/or ductility exceeding 15-20% elongation to failure.

13 Claims, 6 Drawing Sheets

Related U.S. Application Data continuation-in-part of application No. 14/627,236, filed on Feb. 20, 2015, now Pat. No. 9,757,796.

(60) Provisional application No. 62/340,074, filed on May 23, 2016, provisional application No. 61/942,879, filed on Feb. 21, 2014.

(51) Int. Cl.

| | |
|---|---|
| *C22F 1/06* | (2006.01) |
| *C21D 10/00* | (2006.01) |
| *B82Y 30/00* | (2011.01) |
| *E02D 27/38* | (2006.01) |
| *C22C 23/02* | (2006.01) |
| *C22C 49/04* | (2006.01) |
| *B22D 27/00* | (2006.01) |
| *B22D 27/08* | (2006.01) |
| *B22D 19/14* | (2006.01) |
| *B22D 27/11* | (2006.01) |
| *C22C 1/03* | (2006.01) |
| *B22D 27/02* | (2006.01) |
| *C22C 23/06* | (2006.01) |
| *C22C 26/00* | (2006.01) |
| *C22C 1/04* | (2023.01) |
| *B22D 21/00* | (2006.01) |
| *C22C 47/08* | (2006.01) |
| *B22D 25/06* | (2006.01) |
| *B22D 23/06* | (2006.01) |
| *B22D 21/04* | (2006.01) |
| *C22C 49/02* | (2006.01) |
| *B22F 1/062* | (2022.01) |
| *C22C 1/10* | (2023.01) |

(52) U.S. Cl.
CPC ............ *B22D 23/06* (2013.01); *B22D 25/06* (2013.01); *B22D 27/00* (2013.01); *B22D 27/02* (2013.01); *B22D 27/08* (2013.01); *B22D 27/11* (2013.01); *B82Y 30/00* (2013.01); *C21D 10/00* (2013.01); *C22C 1/03* (2013.01); *C22C 1/0408* (2013.01); *C22C 23/00* (2013.01); *C22C 23/02* (2013.01); *C22C 23/06* (2013.01); *C22C 26/00* (2013.01); *C22C 47/08* (2013.01); *C22C 49/04* (2013.01); *E02D 27/38* (2013.01); *B22F 1/062* (2022.01); *B22F 2998/10* (2013.01); *B22F 2999/00* (2013.01); *C22C 1/1047* (2023.01); *C22C 49/02* (2013.01); *C22C 2026/002* (2013.01)

(56) References Cited

U.S. PATENT DOCUMENTS

| | | | |
|---|---|---|---|
| 4,264,362 A | 4/1981 | Serveg et al. |
| 4,655,852 A | 4/1987 | Rallis |
| 4,875,948 A | 10/1989 | Vernecker |
| 5,106,702 A | 4/1992 | Walker et al. |
| 5,240,495 A | 8/1993 | Dieckmann et al. |
| 5,336,466 A | 8/1994 | Iba |
| 5,342,576 A | 8/1994 | Whitehead |
| 5,552,110 A | 9/1996 | Iba |
| 5,767,562 A | 6/1998 | Yamashita |
| 5,894,007 A | 11/1999 | Yuan et al. |
| 5,980,602 A | 11/1999 | Carden |
| 6,036,792 A | 3/2000 | Chu et al. |
| 6,126,898 A | 10/2000 | Butler |
| 6,422,314 B1 | 7/2002 | Todd et al. |
| 6,444,316 B1 | 9/2002 | Reddy et al. |
| 6,527,051 B1 | 3/2003 | Reddy et al. |
| 6,554,071 B1 | 4/2003 | Reddy et al. |
| 6,737,385 B2 | 5/2004 | Todd et al. |
| 7,350,582 B2 | 4/2008 | McKeachnie et al. |
| 7,353,879 B2 | 4/2008 | Todd et al. |
| 7,531,020 B2 | 5/2009 | Woodfield et al. |
| 7,647,964 B2 | 1/2010 | Akbar et al. |
| 7,690,436 B2 | 4/2010 | Turley et al. |
| 7,771,547 B2 | 8/2010 | Bieler et al. |
| 7,794,520 B2 | 9/2010 | Murty et al. |
| 7,879,162 B2 | 2/2011 | Pandey |
| 7,999,987 B2 | 8/2011 | Dellinger et al. |
| 8,034,152 B2 | 10/2011 | Westin et al. |
| 8,211,247 B2 | 7/2012 | Marya et al. |
| 8,211,248 B2 | 7/2012 | Marya |
| 8,211,331 B2 | 7/2012 | Jorgensen et al. |
| 8,220,554 B2 | 7/2012 | Jordan et al. |
| 8,230,731 B2 | 7/2012 | Dyer et al. |
| 8,267,177 B1 | 9/2012 | Vogel et al. |
| 8,327,931 B2 | 12/2012 | Agrawal et al. |
| 8,403,037 B2 | 3/2013 | Agrawal et al. |
| 8,413,727 B2 | 4/2013 | Holmes |
| 8,425,651 B2 | 4/2013 | Xu et al. |
| RE44,385 E | 7/2013 | Johnson |
| 8,485,265 B2 | 7/2013 | Marya et al. |
| 8,486,329 B2 | 7/2013 | Shikai et al. |
| 8,506,733 B2 | 8/2013 | Enami et al. |
| 8,528,633 B2 | 9/2013 | Agrawal et al. |
| 8,573,295 B2 | 11/2013 | Johnson et al. |
| 8,613,789 B2 | 12/2013 | Han et al. |
| 8,631,876 B2 | 1/2014 | Xu et al. |
| 8,663,401 B2 | 3/2014 | Marya et al. |
| 8,668,762 B2 | 3/2014 | Kim et al. |
| 8,695,684 B2 | 4/2014 | Chen et al. |
| 8,695,714 B2 | 4/2014 | Xu |
| 8,714,268 B2 | 5/2014 | Agrawal et al. |
| 8,723,564 B2 | 5/2014 | Kim et al. |
| 8,746,342 B1 | 6/2014 | Nish et al. |
| 8,776,884 B2 | 7/2014 | Xu |
| 8,789,610 B2 | 7/2014 | Oxford |
| 8,808,423 B2 | 8/2014 | Kim et al. |
| 8,905,147 B2 | 12/2014 | Fripp et al. |
| 8,967,275 B2 | 3/2015 | Crews |
| 9,016,363 B2 | 4/2015 | Xu et al. |
| 9,016,384 B2 | 4/2015 | Xu |
| 9,027,655 B2 | 5/2015 | Xu |
| 9,068,428 B2 | 6/2015 | Mazyar et al. |
| 9,080,439 B2 | 7/2015 | O'Malley |
| 9,101,978 B2 | 8/2015 | Xu |
| 9,181,088 B2 | 11/2015 | Sibuet et al. |
| 9,187,686 B2 | 11/2015 | Crews |
| 9,217,319 B2 | 12/2015 | Frazier et al. |
| 9,227,243 B2 | 1/2016 | Xu et al. |
| 9,243,475 B2 | 1/2016 | Xu |
| 9,309,744 B2 | 4/2016 | Frazier |
| 9,447,482 B2 | 9/2016 | Kim et al. |
| 9,528,343 B2 | 12/2016 | Jordan et al. |
| 9,605,508 B2 | 3/2017 | Xu |
| 9,938,451 B2 | 4/2018 | Crews |
| 2002/0121081 A1 | 9/2002 | Cesaroni et al. |
| 2002/0197181 A1 | 12/2002 | Osawa et al. |
| 2003/0173005 A1 | 9/2003 | Higashi |
| 2005/0194141 A1 | 9/2005 | Sinclair et al. |
| 2006/0113077 A1 | 6/2006 | Willberg et al. |
| 2006/0131031 A1 | 6/2006 | McKeachnie |
| 2006/0175059 A1 | 8/2006 | Sinclair et al. |
| 2006/0207387 A1 | 9/2006 | Soran et al. |
| 2006/0278405 A1 | 12/2006 | Turley |
| 2007/0181224 A1 | 8/2007 | Marya et al. |
| 2008/0041500 A1 | 2/2008 | Bronfin |
| 2008/0149345 A1 | 6/2008 | Marya et al. |
| 2008/0175744 A1 | 7/2008 | Motegi |
| 2009/0116992 A1 | 5/2009 | Lee |
| 2009/0226340 A1 | 9/2009 | Marya |
| 2010/0119405 A1 | 5/2010 | Okamoto et al. |
| 2010/0161031 A1 | 6/2010 | Papirov et al. |
| 2010/0270031 A1 | 10/2010 | Patel |
| 2010/0304178 A1 | 12/2010 | Dirscherl |
| 2011/0048743 A1 | 3/2011 | Stafford et al. |
| 2011/0067889 A1 | 3/2011 | Marya et al. |
| 2011/0091660 A1 | 4/2011 | Dirscherl |
| 2011/0135530 A1 | 6/2011 | Xu et al. |

(56) References Cited

U.S. PATENT DOCUMENTS

| | | |
|---|---|---|
| 2011/0221137 A1 | 9/2011 | Obi et al. |
| 2011/0236249 A1 | 9/2011 | Kim et al. |
| 2012/0080189 A1 | 4/2012 | Marya et al. |
| 2012/0097384 A1 | 4/2012 | Valencia et al. |
| 2012/0103135 A1 | 5/2012 | Xu et al. |
| 2012/0125642 A1 | 5/2012 | Chenault |
| 2012/0156087 A1 | 6/2012 | Kawabata |
| 2012/0177905 A1 | 7/2012 | Seals et al. |
| 2012/0190593 A1 | 7/2012 | Soane et al. |
| 2012/0273229 A1 | 11/2012 | Xu et al. |
| 2012/0318513 A1 | 12/2012 | Mazyar et al. |
| 2013/0022816 A1 | 1/2013 | Smith et al. |
| 2013/0029886 A1 | 1/2013 | Mazyar et al. |
| 2013/0032357 A1 | 2/2013 | Mazyar et al. |
| 2013/0043041 A1 | 2/2013 | McCoy et al. |
| 2013/0047785 A1 | 2/2013 | Xu |
| 2013/0056215 A1 | 3/2013 | Crews |
| 2013/0068411 A1 | 3/2013 | Forde et al. |
| 2013/0112429 A1 | 5/2013 | Crews |
| 2013/0133897 A1 | 5/2013 | Bailhly et al. |
| 2013/0160992 A1 | 6/2013 | Agrawal et al. |
| 2013/0168257 A1 | 7/2013 | Mazyar et al. |
| 2013/0199800 A1 | 8/2013 | Kellner et al. |
| 2013/0209308 A1 | 8/2013 | Mazyar et al. |
| 2013/0261735 A1 | 10/2013 | Pacetti et al. |
| 2013/0048289 A1 | 12/2013 | Mazyar |
| 2014/0018489 A1 | 1/2014 | Johnson |
| 2014/0027128 A1 | 1/2014 | Johnson |
| 2014/0060834 A1 | 3/2014 | Quintero |
| 2014/0093417 A1 | 4/2014 | Liu |
| 2014/0124216 A1 | 5/2014 | Fripp et al. |
| 2014/0190705 A1 | 7/2014 | Fripp |
| 2014/0196889 A1 | 7/2014 | Jordan et al. |
| 2014/0202284 A1 | 7/2014 | Kim |
| 2014/0202708 A1 | 7/2014 | Jacob et al. |
| 2014/0219861 A1 | 8/2014 | Han |
| 2014/0224477 A1 | 8/2014 | Wiese et al. |
| 2014/0236284 A1 | 8/2014 | Stinson |
| 2014/0271333 A1 | 9/2014 | Kim et al. |
| 2014/0286810 A1 | 9/2014 | Marya |
| 2014/0305627 A1 | 10/2014 | Manke |
| 2015/0102179 A1 | 4/2015 | McHenry et al. |
| 2015/0240337 A1 | 8/2015 | Sherman et al. |
| 2015/0247376 A1 | 9/2015 | Tolman |
| 2015/0299838 A1 | 10/2015 | Doud |
| 2015/0354311 A1 | 12/2015 | Okura et al. |
| 2016/0024619 A1 | 1/2016 | Wilkes et al. |
| 2016/0201425 A1 | 7/2016 | Walton |
| 2016/0201427 A1 | 7/2016 | Fripp |
| 2016/0201435 A1 | 7/2016 | Fripp et al. |
| 2016/0230494 A1 | 8/2016 | Fripp et al. |
| 2016/0251934 A1 | 9/2016 | Walton et al. |
| 2016/0265091 A1 | 9/2016 | Walton et al. |

FOREIGN PATENT DOCUMENTS

| | | |
|---|---|---|
| CN | 102517489 | 6/2012 |
| CN | 102796928 | 11/2012 |
| CN | 103343271 | 10/2013 |
| CN | 103602865 | 2/2014 |
| CN | 103898384 | 7/2014 |
| EP | 0470599 | 2/1998 |
| EP | 2088217 | 8/2009 |
| JP | 2008266734 | 11/2008 |
| JP | 2012197491 | 10/2012 |
| JP | 2013019030 | 1/2013 |
| JP | 2014043601 | 3/2014 |
| KR | 20130023707 | 3/2013 |
| WO | 1990002655 | 3/1990 |
| WO | 1992013978 | 8/1992 |
| WO | 9857347 | 12/1998 |
| WO | 1999027146 | 6/1999 |
| WO | 2009055354 | 4/2009 |
| WO | 2009093420 | 7/2009 |
| WO | 2012091984 | 7/2012 |
| WO | 2013019410 | 2/2013 |
| WO | 2013019421 | 2/2013 |
| WO | 2013109287 | 7/2013 |
| WO | 2013122712 | 8/2013 |
| WO | 201354634 | 10/2013 |
| WO | 2014100141 | 6/2014 |
| WO | 2014113058 | 7/2014 |
| WO | 2015171126 | 11/2015 |
| WO | 2016032758 | 3/2016 |
| WO | 2016032761 | 3/2016 |
| WO | 2016036371 | 3/2016 |

OTHER PUBLICATIONS

Hillis et al., "High Purity Magnesium AM60 Alloy: The Critical Contaminant Limits and the Salt Water Corrosion Performance", SAE Technical Paper Series (1986).

Pawar, S.G., "Influence of Microstructure on the Corrosion Behaviour of Magnesium Alloys", PhD Dissertation, University of Manchester (2011).

Czerwinski, "Magnesium Injection Molding"; Technology & Engineering; Springer Science + Media, LLC, pp. 107-108, (Dec. 2007).

Saravanan et al., "Fabrication and characterization of pure magnesium-30 vol SiCP particle composite", Material Science and Eng., vol. 276, pp. 108-116 (2000).

Song et al., Texture evolution and mechanical properties of AZ31B magnesium alloy sheets processed by repeated unidirectional bending, Journal of Alloys and Compounds, vol. 489, pp. 475-481 (2010).

Blawert et al., "Magnesium secondary alloys: Alloy design for magnesium alloys with improved tolerance limits against impurities", Corrosion Science, vol. 52, No. 7, pp. 2452-2468 (Jul. 1, 2010).

Wang et al., "Effect of Ni on microstructures and mechanical properties of AZ1 02 magnesium alloys" Zhuzao Foundry, Shenyang Zhuzao Yanjiusuo, vol. 62, No. 1, pp. 315-318 (Jan. 1, 2013).

Kim et al., "Effect of aluminum on the corrosions characteristics of Mg—4Ni—xAl alloys", Corrosion, vol. 59, No. 3, pp. 228-237 (Jan. 1, 2003).

Unsworth et al., "A new magnesium alloy system", Light Metal Age, vol. 37, No. 7-8., pp. 29-32 (Jan. 1, 1979).

Geng et al., "Enhanced age-hardening response of Mg—Zn alloys via Co additions", Scripta Materialia, vol. 64, No. 6, pp. 506-509 (Mar. 1, 2011).

Zhu et al., "Microstructure and mechanical properties of Mg6ZnCuO. 6Zr (wt. %) alloys", Journal of Alloys and Compounds, vol. 509, No. 8, pp. 3526-3531 (Dec. 22, 2010).

International Search Authority, International Search Report and Written Opinion for PCT/GB2015/052169 (dated Feb. 17, 2016).

Search and Examination Report for GB 1413327.6 (dated Jan. 21, 2015).

Magnesium Elektron Test Report (Mar. 8, 2005).

New England Fishery Management Counsel, "Fishery Management Plan for American Lobster Amendment 3" (Jul. 1989).

Emly, E.F., "Principles of Magnesium Technology" Pergamon Press, Oxford (1966).

Shaw, "Corrosion Resistance of Magnesium Alloys", ASM Handbook, vol. 13A, pp. 692-696 (2003).

Hanawalt et al., "Corrosion studies of magnesium and its alloys", Metals Technology, Technical Paper 1353 (1941).

The American Foundry Society, Magnesium alloys, casting source directory 8208, available at www.afsinc.org/files/magnes.pdf.

Rokhlin, "Magnesium alloys containing rare earth metals structure and properties", Advances in Metallic Alloys, vol. 3, Taylor & Francis (2003).

Ghali, "Corrosion Resistance of Aluminum and Magnesium Alloys" pp. 382-389, Wiley Publishing (2010).

Kim et al., "High Mechanical Strengths of Mg—Ni—Y and Mg—Cu Amorphous Alloys with Significant Supercooled Liquid Region", Materials Transactions, vol. 31, No. 11, pp. 929-934 (1990).

Tekumalla et al., "Mehcanical Properties of Magnesium-Rare Earth Alloy Systems", Metals, vol. 5, pp. 1-39 (2014).

(56) References Cited

OTHER PUBLICATIONS

Sigworth et al. "Grain Refinement of Aluminum Castings Alloys" American Foundry Society; Paper 07-67; pp. 5-7 (2007).
Momentive, "Titanium Diborid Powder" condensed product brochure; retrieved from https://www.momentive.com/WorkArea/DownloadAsset.aspx?id+27489.; p. 1 (2012).
Durbin, "Modeling Dissolution in Aluminum Alloys" Dissertation for Georgia Institute of Technology; retrieved from https://smartech;gatech/edu/bitstream/handle/1853/6873/durbin_tracie_L_200505_phd.pdf> (2005).
Pegeut et al.., "Influence of cold working on the pitting corrosion resistance of stainless steel" Corrosion Science, vol. 49, pp. 1933-1948 (2007).
Elemental Charts from chemicalelements.com; retrieved Jul. 27, 2017.
Song et al., "Corrosion Mechanisms of Magnesium Alloys" Advanced Engg Materials, vol. 1, No. 1 (1999).
Zhou et al., "Tensile Mechanical Properties and Strengthening Mechanism of Hybrid Carbon Nanotubes . . . " Journal of Nanomaterials, 2012; 2012:851862 (doi: 10.1155/2012/851862) Figs. 6 and 7.
Trojanova et al., "Mechanical and Acoustic Properties of Magnesium Alloys . . . " Light Metal Alloys Application, Chapter 8, Published Jun. 11, 2014 (doi: 10.5772/57454) p. 163, para. [0008], [0014-0015]; [0041-0043].
AZoNano "Silicon Carbide Nanoparticles-Properties, Applications" http://www.amazon.com/articles.aspx?ArticleD=3396) p. 2, Physical Properties, Thermal Properties (May 9, 2013).
AZoM "Magnesium AZ91D-F Alloy" http://www.amazon.com/articles.aspx?ArticleD=8670) p. 1, Chemical Composition; p. 2 Physical Properties (Jul. 31, 2013.
Elasser et al., "Silicon Carbide Benefits and Advantages . . . " Proceedings of the IEEE, 2002; 906(6):969-986 (doi: 10.1109/JPROC.2002.1021562) p. 970, Table 1.
Lan et al., "Microstructure and Microhardness of SiC Nanoparticles . . . " Materials Science and Engineering A; 386:284-290 (2004).
Casati et al., "Metal Matrix Composites Reinforced by Nanoparticles", vol. 4:65-83 (2014).
National Physical Laboratory, "Bimetallic Corrosion" Crown (C) p. 1-14 (2000).
Ye et al., "Review of recent studies in magnesium matrix composites", Journal of Material Science, vol. 39, pp. 6153-6171 (2004).
Hassan et al., "Development of a novel magnesium-copper based composite with improved mechanical properties", Materials Research Bulletin, vol. 37, pp. 377-389 (2002).
Ye et al., "Microstructure and tensile properties of Ti6A14V/AM60B magnesium matrix composite", Journal of Alloys and Composites, vol. 402, pp. 162-169 (2005).
Kumar et al., "Mechanical and Tribological Behavior of Particulate Reinforced Aluminum metal Matrix Composite", Journal of Minerals & Materials Characterization and Engineering, vol. 10, pp. 59-91 (2011).
Majumdar, "Micromechanics of Discontinuously Reinforced MMCs", Engineering Mechanics and Analysis of Metal-Matrix Composites, vol. 21, pp. 395-406.

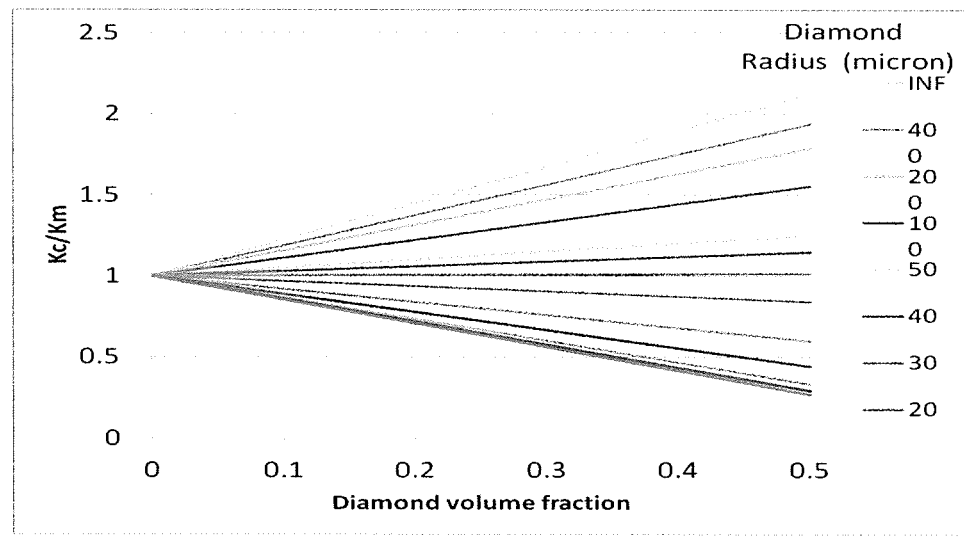
FIG.1
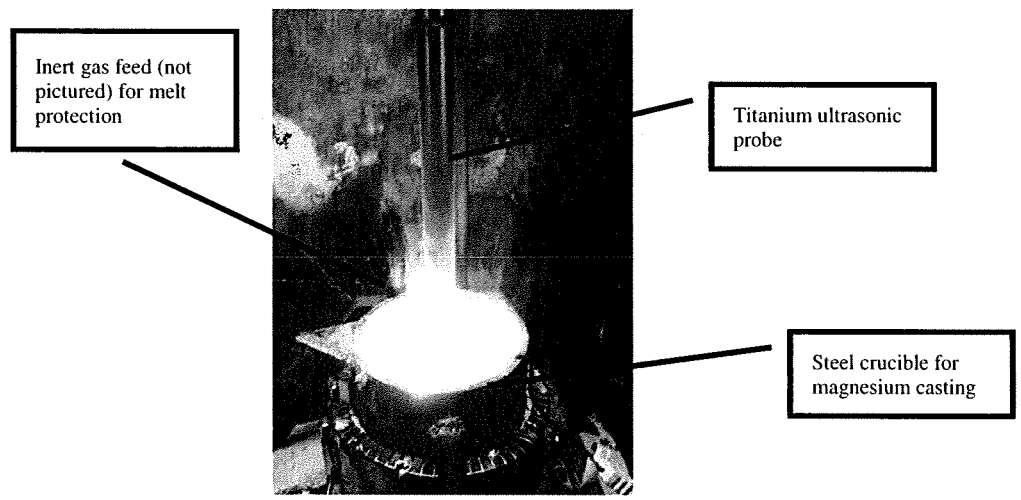
FIG. 2 - Small Scale Ultrasonic Caster

HIGH CONDUCTIVITY MAGNESIUM ALLOY

This invention is a divisional application of U.S. patent application Ser. No. 15/601,451 filed May 22, 2017, which in turn claims priority on U.S. Provisional Patent Application Ser. No. 62/340,074 filed May 23, 2016, which is incorporated herein. The present invention is also a divisional application of U.S. patent application Ser. No. 15/601,451 filed May 22, 2017, which in turn is a continuation-in-part of U.S. patent application Ser. No. 14/627,236 filed Feb. 20, 2015 (now U.S. Pat. No. 9,757,796; issued Sep. 12, 2017), which in turn claims priority on U.S. Provisional Application Ser. No. 61/942,879 filed Feb. 21, 2014, which is incorporated herein by reference.

This invention was made with partial support from the US government under Contract No. NNX14CM36P awarded by National Aeronautics and Space Administration (NASA). The U.S. government has certain rights in the invention.

The present invention relates to composites and methods for manufacture of a high conductivity magnesium composite, particularly to a magnesium-based composite and methods for manufacture of such composite wherein the composite has improved thermal and mechanical properties, more particularly to a magnesium-based composite and method for manufacture of such composite wherein the composite has improved thermal and mechanical properties by the modification of grain boundary thermal resistance through the addition of insoluble nanoparticles that are generally high conductivity metal materials to the high strength magnesium-based composite, and still more particularly to a magnesium-based composite and method for manufacture of such composite wherein the composite has improved thermal and mechanical properties by the modification of grain boundary thermal resistance through the addition of insoluble nanoparticles that are generally high conductivity metal materials to the magnesium-based composite wherein the magnesium-based composite has a thermal conductivity greater than 180 W/m-K. The magnesium-based composite can be used as a dissolvable structure in oil drilling. Specifically, the magnesium-based composite can be formed into a ball or other structure in a well drilling or completion operation, such as a structure that is seated in a hydraulic operation, that can be dissolved away after use so that that no drilling or removal of the structure is necessary. Primarily, dissolution is measured as the time it takes for the ball to remove itself from the seat or can become free floating in the system. Secondarily, dissolution is measured as time it takes the ball to fully dissolve into submicron particles. Furthermore, the magnesium-based composite of the present invention can be used in other well structures that also desire the function of dissolving after a period of time. The material is machinable and can be used in place of existing metallic or plastic structures in oil and gas drilling rigs including, but not limited to, water injection and hydraulic fracturing.

BACKGROUND OF INVENTION

The ability to control the dissolution of a down hole well structure in a variety of solutions is very important to the utilization of non-drillable completion tools, such as sleeves frac balls, hydraulic actuating tooling, and the like. Reactive materials for this application, which dissolve or corrode when exposed to acid, salt, and/or other wellbore conditions, have been proposed for some time. Generally, these consist of materials that are engineered to dissolve or corrode. Dissolving polymers and some powder metallurgy metals have been disclosed and are also used extensively for controlled release of drugs in the pharmaceutical industry.

While these systems have enjoyed modest success in reducing well completion costs, their consistency and ability to specifically control dissolution rates in specific solutions, as well as other drawbacks such as limited strength and poor reliability, have impacted their widespread adoption. Ideally, these structures would be manufactured by a process that is low cost, scalable, and produces a controlled corrosion rate having similar or increased strength as compared to traditional engineering alloys such as aluminum, magnesium, and iron. Ideally, traditional heat treatments, deformation processing, and machining techniques would be used without impacting the dissolution rate and reliability of such structures.

Magnesium alloys can be strengthened through grain refinement and second phase additions. While pure magnesium has a relatively good thermal conductivity of 156 W/m-K (the thermal conductivity is at about ⅔ of aluminum (237 W/m-K)), additions of second phases and the refining of the grain size in magnesium alloys have resulted in dramatic reduction in the thermal conductivity of the magnesium alloys. High strength casting alloys, such as the AM series alloys (Mg—Al—Mn alloy) and AZ series alloys (Mg—Al—Zn alloy), have conductivities significantly below 100 W/m-K, less than half that of comparable strength aluminum alloys.

The addition of high thermal conductivity phases to some alloys, such as carbon fibers and diamond particles, has been known as a method of increasing thermal conductivity of metals, generally following the rule of mixtures enhancement of thermal conductivity. While the addition of a large volume percent of high thermal conductivity phases, such as SiC and graphite or carbon materials, to certain alloys has been shown to increase thermal conductivity in select alloys, such additions have typically resulted in increased brittleness of the alloy and the inability to cast or otherwise form the alloy. As such, these types of alloys have been economically unattractive to use.

Attempts to improve mechanical properties of magnesium alloys while also enhancing the thermal performance of such alloys by using smaller particles have been generally unsuccessful.

The addition of nanoparticle dispersions has been shown as a way of increasing mechanical properties in light metal alloys, including magnesium alloys. However, the addition of high surface area materials to the magnesium and other light metals is also known to decrease the thermal conductivity of magnesium and other light metal alloys due to high interfacial resistance.

Research published by Hasselman et al. (D. P. Hasselman and L. F. Johnson; "*Effective Thermal Conductivity of Composites with Interfacial Thermal Barrier Resistance*", J. *Composites* 21: pp. 508-515, (1987)) determined that interfacial resistance dominates with particles below 60-100 microns, and that larger particles are needed to enhance thermal conductivity of composites. In aluminum composites, significant work was carried out (by the author and others) using controlled interfaces (such as tungsten) to enable finer particles to be utilized, with some success. However, additions of nanoscale high conductivity phases have generally not been successful at enhancing thermal properties, and most often degrade the properties of aluminum alloys.

Li et al. (U.S. Pat. No. 8,734,602) has demonstrated that specific fabrication routes of adding nanoparticles can lead to an enhancement of damping (acoustic/thermal loss) internal resistances using semi-solid mixing. Much work has been reported about methods for incorporating nanoparticles into metals, including adding nanoparticles in the semi-solid state (which can lead to high damping, per Li et al.), using high shear and ultrasonic mixing to disperse particle agglomerates, and using powder metallurgy to prepare pre-dispersed materials for melt addition. Each of these methods, and their associated thermal and mechanical processing history, lead to different microstructures and degrees of dispersion of the nanoparticles in the molten alloy.

Jin et al. (U.S. Pat. No. 7,959,830) describes the concentrating of high electrical conductivity particles near the surface of copper alloys to create a structure with improved wear resistance without a significant degradation in electrical properties.

Angelie et al. (U.S. Pat. No. 6,251,159) discloses a dispersion strengthening method for metallic melts that is used to form large particles. The method comprises adding nanophase particles into a molten metallic melt and dispersing the nanophase particles in the metallic melt. The nanophase particles comprise particles with diameters in the range of about 5 nanometers to about 100 nanometers.

Lim et al. (U.S. Pat. No. 5,614,684) discloses a method for the production of a superplastic magnesium-based composite by preparing a composite consisting of ceramic particles formed of at least one compound selected from among TiC, AlN, $Si_3N_4$, and $TiB_2$ and a matrix formed of a magnesium alloy.

In view of the prior art, there remains a need to form a magnesium-based composite that has improved thermal conductivity and which magnesium-based composite does not have increased brittleness, and which alloy can be cast or otherwise formed.

SUMMARY OF THE INVENTION

The present invention is directed to a cast or wrought magnesium-based composite incorporating insoluble nanoparticles and optional insoluble micron-sized particles, and method for manufacture of such magnesium-based composite. The magnesium-based composite has improved thermal, physical, and mechanical properties as compared to prior art magnesium alloys. The nanoparticles and optional micron-sized particles can be selected and used in quantities so that the grain boundaries of the magnesium-based composite contain a desired composition and morphology to achieve the desired physical and chemical properties of the composite and to optionally obtain a specific galvanic corrosion rate in the entire composite or along the grain boundaries of the composite. The addition of insoluble particles to the metal or metal alloy can be used to enhance mechanical properties of the magnesium-based composite, such as ductility and/or tensile strength. The final casting (when used) can optionally be enhanced by heat treatment as well as deformation processing (such as extrusion, forging, or rolling) to further improve the strength of the final magnesium-based composite over the as-cast material. The deformation processing achieves strengthening by reducing the grain size of the magnesium-based composite. Further enhancements, such as traditional alloy heat treatments (such as solutionizing, aging and cold working) can optionally be used without dissolution impact if further improvements are desired.

In one non-limiting aspect of the invention, a cast or wrought structure of the magnesium-based composite can be made into almost any shape.

In another and/or alternative non-limiting aspect of the invention, ultrasonic dispersion and/or electro-wetting of insoluble nanoparticles can be used for further enhancement of strength and/or ductility the magnesium-based composite.

In still another and/or alternative non-limiting aspect of the invention, a magnesium-based composite is formed of by casting with at least one insoluble phase in discrete particle form in the metal or metal alloy. The discrete insoluble particles generally have a different galvanic potential from the base metal or metal alloy. The discrete insoluble particles are generally uniformly dispersed through the base metal or base metal alloy using techniques such as thixo-molding, stir casting, mechanical agitation, electrowetting, ultrasonic dispersion, and/or combinations of these methods; however, this is not required. Due to the insolubility and difference in atomic structure in the melt material and the insoluble particles, the insoluble particles will be pushed to the grain boundary during casting solidification. Because the insoluble particles will generally be pushed to the grain boundary, such feature makes engineering grain boundaries to control the dissolution rate of the casting possible, if so desired. This feature also allows for further grain refinement of the final alloy through traditional deformation processing to increase tensile strength, elongation to failure, and/or other properties in the alloy system that are not achievable without the use of insoluble particle additions. The ratio of insoluble particles in the grain boundary is generally constant and the grain boundary to grain surface area is typically consistent even after deformation processing and heat treatment of the magnesium-based composite.

In yet another and/or alternative non-limiting aspect of the invention, the magnesium-based composite can be designed to corrode at the grains, the grain boundaries, and/or the insoluble particle additions.

In another and/or alternative non-limiting aspect of the invention, when a slower corrosion rate is desired, two or more different insoluble particle compositions can be added to the base metal or base metal alloy to be deposited at the grain boundary. When the exposed surface area of the second insoluble particle composition is removed from the system, the system reverts to the two previous embodiments described above until more particles of the second insoluble particle composition are exposed. This arrangement creates a mechanism to retard the corrosion rate with minor additions of the second insoluble particle composition.

In still another and/or alternative non-limiting aspect of the invention, the rate of corrosion in the entire casting system can be controlled by the surface area and, thus, the particle size and morphology of the insoluble particle additions.

In yet another and/or alternative non-limiting aspect of the invention, there is provided a magnesium-based composite wherein the grain boundary composition and the size and/or shape of the insoluble phase additions can be used to control the dissolution rate of such composite. The composition of the grain boundary layer can optionally include two added insoluble particles having a different composition with different galvanic potentials as compared to the base metal or base metal alloy. As defined herein, insoluble particles (e.g., insoluble nanoparticles, insoluble micron-sized particles) have a solubility in the base metal or base metal alloy (e.g., magnesium or magnesium alloy) of less than about 5% (e.g., 0%-4.9999% and all values and ranges therebetween) when forming the magnesium-based composite, typically less than about 1%, and more typically less than about 0.5%. The strength of the magnesium-based composite can optionally be increased using deformation processing and a change dissolution rate of less than about 20% (e.g., 0.0001-19.999% and all values and ranges therebetween), typically less than about 10%, and more typically less than about 5%. The ductility of the magnesium-based composite can optionally be increased using insoluble nanoparticle additions. The magnesium-based composite can optionally include chopped fibers.

The insoluble particle additions (e.g., insoluble nanoparticles, insoluble micron-sized particles) to the magnesium-based composite can be used to improved toughness of the magnesium-based composite. The magnesium-based composite can have improved tensile strength and/or elongation due to heat treatment without significantly affecting the dissolution rate of the magnesium-based composite. The magnesium-based composite can have improved tensile strength and/or elongation by extrusion and/or another deformation process for grain refinement without significantly affecting the dissolution rate of the magnesium-based composite. In such a process, the dissolution rate change can be less than about 10% (e.g., 0-10% and all values and ranges therebetween), typically less than about 5%, and more typically less than about 1%. The magnesium-based composite can optionally have controlled or engineered morphology (particle shape and size of the insoluble particle additions) to control the dissolution rate of the magnesium-based composite. The insoluble particles in the magnesium-based composite can optionally have a surface area of 0.001 m$^2$/g-200 m$^2$/g (and all values and ranges therebetween). The insoluble particles in the magnesium-based composite optionally are or include non-spherical particles. The insoluble nanoparticles in the magnesium-based composite optionally are or include nanotubes and/or nanowires. The non-spherical insoluble particles can be added to control corrosion rates without changing composition. The insoluble particles in the magnesium-based composite optionally are or include spherical particles. The spherical particles (when used) can have the same or varying diameters. Such particles are optionally used at the same volume and/or weight fraction to increase cathode particle surface area to control corrosion rates without changing composition. Particle reinforcement in the magnesium-based composite can optionally be used to improve the mechanical properties of the magnesium-based composite and/or to act as part of the galvanic couple. The insoluble particles in the magnesium-based composite can optionally be used as a grain refiner, as a stiffening phase to the base metal or base metal alloy, and/or to increase the strength of the magnesium-based composite. The insoluble particles in the magnesium-based composite can optionally be less than about 1 µm in size (e.g., 0.001-0.999 µm and all values and ranges therebetween), typically less than about 0.5 µm, more typically less than about 0.1 µm, and more typically less than about 0.05 µm. The insoluble particles can optionally be dispersed throughout the magnesium-based composite using ultrasonic means, by electrowetting of the insoluble particles, and/or by mechanical agitation. The magnesium-based composite can optionally be used to form all or part of a device for use in hydraulic fracturing systems and zones for oil and gas drilling, wherein the device has a designed dissolving rate. The magnesium-based composite can optionally be used to form all or part of a device for structural support or component isolation in oil and gas drilling and completion systems, wherein the device has a designed dissolving rate.

In still yet another and/or alternative non-limiting aspect of the invention, there is provided a magnesium-based composite that includes a base metal or base metal alloy and a plurality of insoluble particles disbursed in said magnesium-based composite, wherein the insoluble particles have a melting point that is greater than a melting point of the base metal or base metal alloy, and at least 50% of the insoluble particles are located in grain boundary layers of the magnesium-based composite. The insoluble particles can optionally have a selected size and shape to control a dissolution rate of the magnesium-based composite. The insoluble particles can optionally have a different galvanic potential than a galvanic potential of the base metal or base metal alloy. The major component of the grain boundary layer optionally has a different composition than the base metal or base metal alloy. The insoluble particles optionally: a) increase ductility of said magnesium-based composite; b) improve toughness of said magnesium-based composite; c) improve elongation of said magnesium-based composite; d) function as a grain refiner in said magnesium-based composite; e) function as a stiffening phase to said base metal or base metal alloy; f) increase strength of said magnesium-based composite; or g) combinations thereof.

There is provided a method for forming a magnesium-based composite that includes: a) providing one or more metals used to form a base metal or base metal alloy; b) providing a plurality of insoluble nanoparticles having a melting point that is greater than a melting point of the base metal or base metal alloy; c) heating the one or more metals until molten; d) mixing the one or more molten metals and the plurality of insoluble particles to form a mixture and to cause the plurality of insoluble particles to disperse in the mixture; and e) cooling the mixture to form the magnesium-based composite; and, wherein the plurality of insoluble particles are disbursed in the magnesium-based composite. Generally, at least 50% of the plurality of the insoluble nanoparticles are located in the grain boundary layers of the magnesium-based composite; however, this is not required. The step of mixing optionally includes mixing using one or more processes selected from the group consisting of thixomolding, stir casting, mechanical agitation, electrowetting and ultrasonic dispersion. The method optionally includes the step of heat treating the magnesium-based composite to improve the tensile strength, elongation, or combinations thereof the magnesium-based composite without significantly affecting a dissolution rate of the magnesium-based composite. The method optionally includes the step of extruding or deforming the magnesium-based composite to improve the tensile strength, elongation, or combinations thereof of said magnesium-based composite without significantly affecting a dissolution rate of the magnesium-based composite. The method optionally includes the step of forming the magnesium-based composite into a device for: a) separating hydraulic fracturing systems and zones for oil and gas drilling; b) structural support or component isolation in oil and gas drilling and completion systems; or c) combinations thereof. There is provided a method for forming a magnesium-based composite that includes mixing a base metal or a base metal alloy in molten form with insoluble particles to form a mixture, and cooling the mixture to form a magnesium-based composite.

The magnesium-based composite includes a modification of grain boundary thermal or sliding resistance through the addition of insoluble nanoparticles to high strength magnesium alloys. The magnesium-based composite has a 10% or greater improvement in thermal conductivity, strength, or strain to failure compared to the base material. For thermally-conductive applications, the magnesium-based composite thermal conductivity is greater than about 140 W/m-K, typically greater than about 160 W/m-K, and more typically greater than about 180 W/m-K. The thermal conductivity of a typical AZ91 base material is about 90, pure Mg is about 140.

It has been found that the addition of insoluble high thermal conductivity nanoparticles in a molten magnesium or magnesium alloy to cause such nanoparticles to concentrate in the interface/second phase regions at the junction of primary grains and at the interfaces of secondary particles and phases leads to a significant enhancement of both thermal conductivity, as well as strain tolerance and processability of the magnesium alloy. In one non-limiting aspect of the invention, the increase in thermal conductivity of the magnesium-based composite (as compared to magnesium or a magnesium alloy that is absent the insoluble nanoparticles) is at least about 10%, typically at least about 15%, more typically at least about 20%, and still more typically at least about 30%. For some magnesium-based composite, the increase in thermal conductivity of the magnesium-based composite (as compared to magnesium or a magnesium alloy that is absent the insoluble nanoparticles) is at least 50%, and in some instances greater than 100%.

By enhancing the strength of these boundary and interfacial regions, while reducing their thermal resistance, a high thermal conductivity magnesium alloy with excellent processability and mechanical properties (particularly toughness or ductility) can be obtained. It was discovered that these phases could be ex situ (e.g., added), such as carbon nanotubes or nanodiamonds, or could be internally formed during cooling, such as Mg—Cu intermetallics.

When the magnesium-based composite includes at least 0.1% by volume of insoluble nanoparticles in a magnesium alloy such as AZ91, the thermal conductivity of engineering the magnesium-based composite was found to be increased by 10-100% (and all values and ranges therebetween) or more, while strain to failure was found to increase by 10-100% (and all values and ranges therebetween) or more as compared to a AX91 alloy that was absent the insoluble nanoparticles. As an added benefit, the magnesium-based composite appeared to inhibit macrosegregation, thus increasing hot tear strength and melt fluidity in the near-liquidus region as compared magnesium or a magnesium alloy that was absent the insoluble nanoparticles. In one non-limiting embodiment of the invention, the magnesium-based composite includes at least about 0.1 vol. % insoluble nanoparticles. In another non-limiting embodiment, the magnesium-based composite includes about 0.1-20 vol. % (and all values and ranges therebetween) insoluble nanoparticles, and typically the magnesium-based composite includes about 0.1-10 vol. % insoluble nanoparticles, more typically the magnesium-based composite includes about 0.2-5 vol. % insoluble nanoparticles, still more typically the magnesium-based composite includes about 0.5-4 vol. % insoluble nanoparticles, and even still more typically the magnesium-based composite includes about 0.5-3 vol. % insoluble nanoparticles. The insoluble nanoparticles generally have an average particle size and/or have at least one dimension of at least 10 nm, and typically at least 60 nm, and typically no more than about 400 nm, typically the insoluble nanoparticles have an average particle size and/or have at least one dimension of no more than about 300 nm, more typically the insoluble nanoparticles have an average particle size and/or have at least one dimension of no more than about 250 nm, and still more typically the insoluble nanoparticles have an average particle size and/or have at least one dimension of no more than about 200 nm. In one non-limiting embodiment of the invention, at least about 5% of the insoluble nanoparticles have an average particle size and/or have at least one dimension of no more than about 200 nm, typically at least about 10% of the insoluble nanoparticles have an average particle size and/or have at least one dimension of no more than about 200 nm, more typically at least about 20% of the insoluble nanoparticles have an average particle size and/or have at least one dimension of no more than about 200 nm, and still more typically at least about 30% of the insoluble nanoparticles have an average particle size of no more than about 200 nm. Larger particles (e.g., insoluble nanoparticles greater than 400 nm, and insoluble micron-sized particles) can be added to the magnesium-based composite to increase the hardness and the stiffness of the magnesium-based composite. These larger particles can generally be added in larger volumes than the 400 nm or smaller insoluble nanoparticles can be added to the magnesium-based composite without percolation; however, this is not required. These larger particles have been found to have less of tendency to concentrate at the grain boundaries or dislocations in the magnesium-based composite of the magnesium-based composite.

In accordance with another and/or alternative non-limiting aspect of the invention, the insoluble nanoparticles that are included in the magnesium-based composite are caused to be at least partially segregated so as to be located within about 200 nm of the grain boundaries or dislocations in the magnesium-based composite (e.g., 0-200 nm and all values and ranges therebetween), typically located within about 100 nm of the grain boundaries or dislocations in the magnesium-based composite, and more typically located within about 50 nm of the grain boundaries or dislocations in the magnesium-based composite.

In accordance with another and/or alternative non-limiting aspect of the invention, the insoluble nanoparticles can include one or more types of materials. In one non-limiting embodiment, the insoluble nanoparticles can include fullerenes (including multi-walled and single-walled carbon nanotubes, graphene, nanodiamonds, buckeyballs); inert ceramics, including submicron and nanoparticles (including nanotubes, platelets, and flakes) of W, SiC, AlN, BeO, BN, and TiB2, as well as high thermal conductivity MAX phase materials (e.g., MAX phases—AB-X compounds with laminate structures); and/or intermetallic particles containing high thermal conductivity Cu, Ag, Al, Be, and/or Au compounds.

In accordance with another and/or alternative non-limiting aspect of the invention, there is provided a magnesium-based composite that optionally includes insoluble micron-sized particles. The addition of micron-sized particles to the magnesium-based composite can be used to increase the hardness and stiffness of the magnesium-based composition; however, this is not required. In another and/or alternative non-limiting embodiment of the invention, the insoluble micron-sized particles (when used) have an average particle size of about 1-800 microns (and all values and ranges therebetween), typically have an average particle size of about 2-500 microns, more typically have an average particle size of about 10-300 microns. In accordance with another and/or alternative non-limiting aspect of the invention, the insoluble micron-sized particles constitute at least 1% by volume of the magnesium-based composite, typically about 0.1-49.5 vol. % (and all values and ranges therebetween) of the magnesium-based composite, more typically about 5-45 vol. % of the magnesium-based composite, and more typically 5-30 vol. % of the magnesium-based composite. The maximum vol. % of insoluble micron-sized particles that can be included in the magnesium-based composition is generally greater than the maximum vol. % of insoluble nanoparticles having a size of no greater than 400 nm; however, this is not required.

In accordance with another and/or alternative non-limiting aspect of the invention, when the magnesium-sized composite includes insoluble micron-sized particles, the micron-sized particles have an average high thermal conductivity of greater than about 140 W/m-K, typically greater than about 160 W/m-K, more typically greater than about 180 W/m-K, still more typically greater than about 200 W/m-K, and yet still more typically greater than about 250 W/m-K.

In accordance with another and/or alternative non-limiting aspect of the invention, the insoluble micron-sized particles (when used), can include one or more types of materials. In one non-limiting embodiment, the micron-sized particles can include carbon fiber; SiC particles, fibers or whiskers; heat-treated graphite; AlN; BN; and/or other high thermal conductivity, thermally-stable materials.

In accordance with another and/or alternative non-limiting aspect of the invention, there is provided a magnesium-based composite that is formed from magnesium or a magnesium alloy and the addition of one or more types of insoluble nanoparticles. When a magnesium alloy is used as the base metal to form the magnesium-based composite, the magnesium alloy can be selected from: AE series alloys (e.g., Mg—Al—Re alloys such as AE42, etc.), AJ series alloys (e.g., Mg—Al—Sr alloys), AM series alloys (e.g., Mg—Al—Mn alloys such as AM20, AM50, AM60, etc.), AS series alloys (AS21, AS 41, etc.), AX series alloys (Mg—Al—Ca), AXJ series alloys (e.g., Mg—Al—Ca—Sr alloys), AZ series alloys (e.g., Mg—Al—Zn alloys such as AZ3 µl, AZ61, AZ80, AZ91, etc.), Elektron 21 series alloys (e.g., Mg—Gd—Nd—Zr alloys such as Elektron ZRE1, etc.), LPSO alloys (e.g., Mg—Zn—Re alloys, Mg—Zn—Y alloys, Mg—Zn—Dy alloys, Mg—Zn—Ho alloys, Mg—Zn—Er alloys, Mg—Zn—Tm alloys, Mg—Zn—Gd alloys, Mg—Zn—Tb alloys, etc.), QE series alloys (e.g., Mg—Ag—Nd—Zr alloys), WE series alloys (Mg—Y-RE), ZE series alloys (e.g., Mg—Zn—RE-Zr alloys such as ZE41, ZE 63, etc.), ZK series alloys (Mg—Zn—Zr), ZM5 series alloys (e.g., Mg—Al—Zn alloy), ZMS series alloys (Mg—Zn—Mn—Sn), or ZW series alloys (Mg—Zn—Y).

In accordance with another and/or alternative non-limiting aspect of the invention, there is provided a magnesium-based composite that has an improved hot tear strength as compared to a magnesium or a magnesium alloy that is absent insoluble nanoparticle additions, and which magnesium-based composite can be die-cast and formed into complex thin-walled shapes. In one non-limiting embodiment of the invention, the hot tear strength of the magnesium-based composite is increased by at least about 15% as compared to magnesium or a magnesium alloy that is absent insoluble nanoparticle additions, typically the hot tear strength of the magnesium-based composite is increased by more than 20% as compared to magnesium or a magnesium alloy that is absent insoluble nanoparticle additions, and more typically the hot tear strength of the magnesium-based composite is increased by more than 30% as compared to magnesium or a magnesium alloy that is absent insoluble nanoparticle additions.

In accordance with another and/or alternative non-limiting aspect of the invention, the magnesium-based composite can be cast (e.g., sand casting, investment casting, and die casting/other permanent mold casting) to have a wall thickness of less than about 2 mm, typically the magnesium-based composite can be cast to have a wall thickness of less than about 1.5 mm, and more typically the magnesium-based composite can be cast to have a wall thickness of less than about 1 mm.

In accordance with another and/or alternative non-limiting aspect of the invention, the insoluble nanoparticles can be formed ex situ and added to the magnesium or magnesium-based alloy while the magnesium or magnesium-based alloy is molten, using various methods to control wetting and dispersion of the insoluble nanoparticles in the molten magnesium or magnesium-based alloy.

In accordance with another and/or alternative non-limiting aspect of the invention, the insoluble nanoparticles can be formed in situ, through addition of reactive species or alloying elements while the magnesium or magnesium-based alloy is in a molten state.

In summary, the invention pertains to a magnesium-based composite that is selected from magnesium or a magnesium alloy having good strength such as magnesium alloys of AE series alloys, AJ series alloys, AM series alloys, AS series alloys, AX series alloys, AXJ series alloys, AZ series alloys, Elektron 21 series alloys, LPSO alloys, QE series alloys, WE series alloys, ZE series alloys, ZK series alloys, ZM5 series alloys, ZMS series alloys, or ZW series alloys, to which about 0.1-20 vol. % insoluble nanoparticles are included in the magnesium or magnesium alloy (e.g., base magnesium metal or base magnesium alloy). The insoluble nanoparticles can be formed of one or more materials, and have the same or different size and shape. Generally, a majority of the insoluble nanoparticles have an average particle size and/or have at least one dimension that is no more than about 400 nm. The insoluble nanoparticles have a thermal conductivity that is greater than about 140 W/m-K. The insoluble nanoparticles are caused to be at least partially segregated so as to be located within about 200 nm of grain boundaries or dislocations in the magnesium or base magnesium alloy. The insoluble nanoparticle additions result in at least about a 10% increase in thermal conductivity, strength, modulus, ductility, and/or other selected property of the magnesium-based composite as compared to magnesium or a magnesium alloy that is absent the insoluble nanoparticles.

The magnesium-based composite can be subjected to deformation processing to have an tensile yield strength that is greater than about 35 ksi, and typically greater than about 45 ksi, while retaining significant ductility of more than 5%, and preferably more than 15% strain to failure.

The magnesium-based composite can be subjected to semi-solid processing such as thixomolding, thixocasting, continuous reheocasting, SIMA processing, and/or other processing techniques to further improve ductility of the material.

The magnesium-based composite can have a strain to failure exceeding about 15%, and preferably exceeds about 20%, compared to 3-14% for magnesium and magnesium alloy.

The magnesium-based composite can be annealed to create a desired microstructure (e.g., stable LPSO phases, alpha-beta microstructures, homogenous solid solutions, or uniform fine precipitates) prior to deformation processing.

The magnesium-based composite can retain excellent mechanical properties as-cast, with or without heat treatment, to include an elongation to failure above about 5%, and generally above about 10%. Magnesium and magnesium alloys generally have an elongation to failure of no more than about 3%.

The magnesium-based composite can be die-cast and formed into complex thin-walled shapes. The magnesium-based composite can have improved hot tear strength of about 10-15% as compared to magnesium or magnesium alloys that are absent insoluble nanoparticles.

The magnesium-based composite can have a wall thickness of the casting (e.g., sand casting, investment casting, and die casting/other permanent mold casting) of less than about 2 mm, and as thin as about 0.3-0.5 mm. Such thickness can be useful in applications such as automotive and aerospace applications.

The magnesium-based composite can include one or more nanoparticles that can include fullerenes (including multi-walled and single-walled carbon nanotubes, graphene, nanodiamonds, buckeyballs); inert ceramics, including submicron and nanoparticles (including nanotubes, platelets, and flakes) of W, SiC, AlN, BeO, BN, and $TiB_2$, as well as high thermal conductivity MAX phase materials (e.g., MAX phases—AB-X compounds with laminate structures); and/or intermetallic particles containing high thermal conductivity Cu, Ag, Al, Be, and/or Au compounds.

The magnesium-based composite can include nanoparticles, and wherein larger nanoparticles can optionally be present. The magnesium-based composite can optionally include insoluble micron-sized particles. The average particle size of the insoluble micron-sized particles is about 1-800 microns (and all values and ranges therebetween). The insoluble micron-sized particles generally have a high thermal conductivity that is greater than about 140 W/m-K. The insoluble micron-sized particles can constitute 0.1-49.5 vol. % (and all values and ranges therebetween) of the magnesium-based composite. When insoluble micron-sized particles are included in the magnesium-based composite, such micron-sized particles can include one or more materials such as diamond; heat-treated carbon fiber; SiC particles, fibers or whiskers; heat-treated graphite; AlN; BN; and/or other high thermal conductivity, thermally-stable materials.

When forming the magnesium-based composite, the insoluble nanoparticles can be formed ex situ and can be added to the magnesium or magnesium alloy while the magnesium or magnesium alloy is molten, and by using various methods to control wetting and dispersion of the insoluble nanoparticles in the molten metal. Wetting of the insoluble nanoparticles can be controlled by pre-dispersion or pre-alloying, by temperature, by surface treatments, by high shear forces, by mechanical (ultrasound or vibrational) or electromagnetic methods to break metal surface tension and force intimate contact and wetting.

When forming the magnesium-based composite, the insoluble nanoparticles can be formed in situ and can be added through addition of reactive species or alloying elements. For example, the addition of B to the molten magnesium or magnesium alloy can be used to create insoluble $MgB_2$ nanoparticles. Also, the addition of polyacrylonitrile, phenol, preceramic polymer, or other prolyzable precursor can be used to create insoluble nanoparticles while the magnesium or magnesium alloy is in a molten state or during the process of solidifying from the molten state. Also, nitrogen, $BCl_3$, or other reactive gas can be added to the molten magnesium or magnesium alloy make corresponding insoluble nanoparticles, such as MgN or $MgB_2$.

The magnesium-based composite can also include galvanically-active phases that produce a controlled dissolution rate of the composite in the presence of tap water or brine or fracking liquid of 10-200 $g/cm^2/hr$. (and all values and ranges therebetween) at a temperature of at least 55° C., typically at a temperature of at least 75° C., more typically at a temperature of at least about 90° C., and even more typically at a temperature of at least about 135° C.

The magnesium-based composite can optionally be solution treated (e.g., to homogenize the material by solutionizing precipitation species) at temperatures from about 250-550° C. (and all values and ranges therebetween).

The magnesium-based composite can optionally be age hardened or tempered at about 150-350° C. (and all values and ranges therebetween). The time and temperature generally are selected to create a uniform dispersion of very fine precipitates in the magnesium-based composite. Longer times are used at lower temperatures, but with less sensitivity. Higher temperatures for shorter times can be used to achieve peak aging, overaging, or underaging to tailor properties, but with much more control over time and temperature than lower temperature aging processes.

The magnesium-based composite can optionally be subjected to thermomechanical processes (e.g., solutionizing, deforming, and then annealing/aging).

The magnesium-based composite can optionally be extruded, rolled, forged, drawn or stamped at temperatures from 250-500° C. (and all values and ranges therebetween) to refine the grain structure in the composite so as to improve the mechanical, thermal and/or electrical properties of the composite. Generally, improvements of greater than 15-20%, and typically greater than 30% are achieved in the magnesium-based composite by such further processing as compared to magnesium or magnesium alloys that are absent insoluble nanoparticles.

The magnesium-based composite generally includes at least 80 wt. % magnesium, and typically about 80-97 wt. % (and all values and ranges therebetween).

The magnesium-based composite can be formed from a magnesium alloy wherein the magnesium content of the alloy is at least about 80 wt. % and the alloy includes one or more of the following alloying agents a) 0.1-10 wt. % aluminum, b) 0.1-9 wt. % calcium, c) 0.1-3 wt. % strontium, d) 0.1-6 wt. % zinc, e) 0.1-1 wt. % zirconium, f) 0.1-5 wt. % niobium, g) 0.1-10 wt. % lithium, h) 0.1-8 wt. % tin, i) 0.1-10 wt. % lanthanide elements, and j) 0.1-10 wt. % yttrium. When lanthanide elements or yttrium are included in the magnesium alloy, such alloying agents can form a long period stacking order, or LPSO phase in the magnesium alloy.

The magnesium-based composite generally retains at least 70% of its room temperature (e.g., 25° C.) tensile strength properties at 150° C., and typically retains at least 85% of its room temperature tensile strength properties at 150° C. The magnesium-based composite generally retains at least 70% of its room temperature mechanical properties at 185° C., and typically retains at least 70% of its room temperature mechanical properties at 200° C.

The magnesium-based composite generally retains an elongation to failure of at least 8% at 25° C.

The magnesium-based composite can optionally include 1-4 wt. % Ca to increase the ignition temperature of the magnesium-based alloy to above 700° C.; however, this is not require.

One non-limiting objective of the present invention is the provision of a castable, moldable, or extrudable magnesium-based composite using a metal or metallic primary alloy that includes insoluble particles dispersed in the metal or metallic primary alloy.

Another and/or alternative non-limiting objective of the present invention is the provision of selecting the type and quantity of insoluble particles so that the grain boundaries of the magnesium-based composite have a desired composition and/or morphology to achieve a specific galvanic corrosion rate in the entire composite and/or along the grain boundaries of the magnesium-based composite.

Still another and/or alternative non-limiting objective of the present invention is the provision of a magnesium-based composite that has insoluble particles located at the grain boundary during the solidification of the magnesium-based composite.

Yet another and/or alternative non-limiting objective of the present invention is the provision of a magnesium-based composite wherein the insoluble particles can be controllably located in the magnesium-based composite in the final casting, as well as the surface area ratio, which enables the use of lower cathode particle loadings compared to a powder metallurgical or alloyed composite to achieve the same dissolution rates.

Still yet another and/or alternative non-limiting objective of the present invention is the provision of a magnesium-based composite wherein the insoluble particles can be used to enhance mechanical properties of the composite, such as ductility and/or tensile strength.

Another and/or alternative non-limiting objective of the present invention is the provision of a magnesium-based composite that can be enhanced by heat treatment as well as deformation processing (such as extrusion, forging, or rolling) to further improve the strength of the final composite.

Still another and/or alternative non-limiting objective of the present invention is the provision of a magnesium-based composite that can be designed such that the rate of corrosion can be controlled through use of certain insoluble particle sizes (while not increasing or decreasing the volume or weight fraction of the insoluble particles) and/or by changing the volume/weight fraction (without changing the insoluble particle size).

Yet another and/or alternative non-limiting objective of the present invention is the provision of a magnesium-based composite that can be can be made into almost any shape.

Still yet another and/or alternative non-limiting objective of the present invention is the provision of a magnesium-based composite that, during solidification, the insoluble particles are pushed to the grain boundaries and the grain boundary composition is modified to achieve the desired dissolution rate.

Still yet another and/or alternative non-limiting objective of the present invention is the provision of a magnesium-based composite that can be designed such that galvanic corrosion only affects the grain boundaries and/or affects the grains based on the composition of the nanoparticles.

Another and/or alternative non-limiting objective of the present invention is the provision of dispersing the insoluble particles in the magnesium-based composite by thixomolding, stir casting, mechanical agitation, electrowetting, ultrasonic dispersion and/or combinations of these processes.

Another and/or alternative non-limiting objective of the present invention is the provision of a magnesium-based composite with at least one insoluble phase in discrete particle form in the metal or metal alloy, and wherein the discrete insoluble particles have a different galvanic potential from the base metal or metal alloy.

Still another and/or alternative non-limiting objective of the present invention is the provision of a magnesium-based composite wherein the ratio of insoluble particles in the grain boundary is generally constant and the grain boundary to grain surface area is typically consistent even after deformation processing and/or heat treatment of the composite.

Yet another and/or alternative non-limiting objective of the present invention is the provision of a magnesium-based composite designed to corrode at the grains, the grain boundaries, and/or the insoluble particle additions depending on selecting where the particle additions fall on the galvanic chart.

Another and/or alternative non-limiting objective of the present invention is the provision of a magnesium-based composite wherein galvanic corrosion in the grains can be promoted by selecting a base metal or base metal alloy that sits at one galvanic potential in the operating solution of choice where its major grain boundary alloy composition will have a different galvanic potential as compared to the matrix grains (i.e., grains that form in the casted base metal or base metal alloy), and an insoluble particle addition can be selected that also has a different galvanic potential.

Still another and/or alternative non-limiting objective of the present invention is the provision of a magnesium-based composite having a slower corrosion rate by adding two or more different insoluble components to the base metal or base metal alloy to be deposited at the grain boundary, wherein the second insoluble component is the most anodic in the entire system.

Still yet another and/or alternative non-limiting objective of the present invention is the provision of a magnesium-based composite wherein the rate of corrosion in the entire system can be controlled by the surface area and, thus, the insoluble particle size and morphology of the insoluble particle additions.

Another and/or alternative non-limiting objective of the present invention is the provision of a magnesium-based composite wherein the grain boundary composition and the size and/or shape of the insoluble particles can be used to control the dissolution rate of such magnesium-based composite.

Still another and/or alternative non-limiting objective of the present invention is the provision of a magnesium-based composite that includes two added insoluble components with different galvanic potentials, which insoluble components either are more anodic or more cathodic as compared to the base metal or base metal alloy.

Yet another and/or alternative non-limiting objective of the present invention is the provision of a magnesium-based composite that includes insoluble particles that have a solubility in the base metal or base metal alloy of no more than about 5%.

Another and/or alternative non-limiting objective of the present invention is the provision of a method for producing a magnesium-based composite that includes the steps of a) providing one or more metals used to form a base metal or base metal alloy; b) providing a plurality of insoluble nanoparticles have a melting point that is greater than a melting point of the base metal or base metal alloy; c) heating the one or more metals until molten; d) mixing the one or more molten metals and the plurality of insoluble particles to form a mixture and to cause the plurality of insoluble particles to disperse in the mixture; e) cooling the mixture to form the magnesium-based composite; and, wherein the plurality of insoluble particles are disbursed in the magnesium-based composite.

Yet another and/or alternative non-limiting objective of the present invention is the provision of a magnesium-based composite wherein at least 50% of the plurality of the insoluble nanoparticles is located in the grain boundary layers of the magnesium-based composite.

Another and/or alternative non-limiting objective of the present invention is the provision of a method for producing a magnesium-based composite that includes the optional step of mixing using one or more processes selected from the group consisting of thixomolding, stir casting, mechanical agitation, electrowetting and ultrasonic dispersion.

Another and/or alternative non-limiting objective of the present invention is the provision of a method for producing a magnesium-based composite that includes the optional step of heat treating the magnesium-based composite to improve the tensile strength, elongation, or combinations thereof the magnesium-based composite without significantly affecting a dissolution rate of the magnesium-based composite.

Another and/or alternative non-limiting objective of the present invention is the provision of a method for producing a magnesium-based composite that includes the optional step of extruding or deforming the magnesium-based composite to improve the tensile strength, elongation, or combinations thereof of said magnesium-based composite without significantly affecting a dissolution rate of the magnesium-based composite.

Another and/or alternative non-limiting objective of the present invention is the provision of a method for producing a magnesium-based composite that includes the optional step of forming the magnesium-based composite into a device for: a) separating hydraulic fracturing systems and zones for oil and gas drilling; b) structural support or component isolation in oil and gas drilling and completion systems; or c) combinations thereof.

Another and/or alternative non-limiting objective of the present invention is the provision of a magnesium-based composite that includes a modification of grain boundary thermal or sliding resistance through the addition of insoluble nanoparticles to high strength magnesium alloys.

Another and/or alternative non-limiting objective of the present invention is the provision of a magnesium-based composite that has a 10% or greater improvement in thermal conductivity, strength, or strain to failure compared to the base material.

Another and/or alternative non-limiting objective of the present invention is the provision of a magnesium-based composite wherein the thermal conductivity is greater than about 140 W/m-K, typically greater than about 160 W/m-K, and more typically greater than about 180 W/m-K.

Another and/or alternative non-limiting objective of the present invention is the provision of a magnesium-based composite wherein the insoluble nanoparticles concentrate in the interface/second phase regions at the junction of primary grains and at the interfaces of secondary particles and phases leads.

Another and/or alternative non-limiting objective of the present invention is the provision of a magnesium-based composite wherein an increase in thermal conductivity of the magnesium-based composite as compared to magnesium or a magnesium alloy that is absent the insoluble nanoparticles is at least about 10%, typically at least about 15%, more typically at least about 20%, and still more typically at least about 30%.

Another and/or alternative non-limiting objective of the present invention is the provision of a magnesium-based composite that has enhanced strength at the boundary and interfacial regions, while reducing its thermal resistance.

Another and/or alternative non-limiting objective of the present invention is the provision of a magnesium-based composite that has enhanced strength at the boundary and interfacial regions, while reducing its thermal resistance with excellent processability and mechanical properties (particularly toughness or ductility).

Another and/or alternative non-limiting objective of the present invention is the provision of a magnesium-based composite that includes at least 0.1% by volume of insoluble nanoparticles.

Another and/or alternative non-limiting objective of the present invention is the provision of a magnesium-based composite wherein the thermal conductivity is increased by at least 10%, the strain to failure is increased by at least 10%.

Another and/or alternative non-limiting objective of the present invention is the provision of a magnesium-based composite that inhibits macrosegregation, thus increasing hot tear strength and melt fluidity in the near-liquidus region as compared magnesium or a magnesium alloy that was absent the insoluble nanoparticles.

Another and/or alternative non-limiting objective of the present invention is the provision of a magnesium-based composite that has insoluble nanoparticles located within about 200 nm of the grain boundaries or dislocations in the magnesium-based composite.

Another and/or alternative non-limiting objective of the present invention is the provision of a magnesium-based composite wherein the insoluble nanoparticles can include one or more types of materials.

Another and/or alternative non-limiting objective of the present invention is the provision of a magnesium-based composite wherein the insoluble nanoparticles can include fullerenes (including multi-walled and single-walled carbon nanotubes, graphene, nanodiamonds, buckeyballs); inert ceramics, including submicron and nanoparticles (including nanotubes, platelets, and flakes) of W, SiC, AlN, BeO, BN, and $TiB_2$, as well as high thermal conductivity MAX phase materials; and/or intermetallic particles containing high thermal conductivity Cu, Ag, Al, Be, and/or Au compounds. MAX phase materials are layered, hexagonal carbides and nitrides have the general formula: $M_{n+1}AX_n$, (MAX) where n=1 to 3, M is an early transition metal, A is an A-group (mostly IIIA and IVA, or groups 13 and 14) element and X is either carbon and/or nitrogen. The layered structure consists of edge-sharing, distorted $XM_6$ octahedra interleaved by single planar layers of the A-group element.

Another and/or alternative non-limiting objective of the present invention is the provision of a magnesium-based composite that optionally includes insoluble micron-sized particles.

Another and/or alternative non-limiting objective of the present invention is the provision of a magnesium-based composite that includes insoluble micron-sized particles Another and/or alternative non-limiting objective of the present invention is the provision of a magnesium-based composite that includes insoluble micron-sized particles having an average high thermal conductivity of greater than about 140 W/m-K, typically greater than about 160 W/m-K, more typically greater than about 180 W/m-K, still more typically greater than about 200 W/m-K, and yet still more typically greater than about 250 W/m-K.

Another and/or alternative non-limiting objective of the present invention is the provision of a magnesium-based composite that includes insoluble micron-sized particles such as carbon fiber; SiC particles, fibers or whiskers; heat-treated graphite; AlN; BN; and/or other high thermal conductivity, thermally-stable materials.

Another and/or alternative non-limiting objective of the present invention is the provision of a magnesium-based composite that is formed from magnesium or a magnesium alloy and the addition of one or more types of insoluble nanoparticles.

Another and/or alternative non-limiting objective of the present invention is the provision of a magnesium-based composite that is formed from a magnesium alloy and the addition of one or more types of insoluble nanoparticles, and wherein the magnesium alloy can be selected from AE series alloys (e.g., Mg—Al—Re alloys such as AE42, etc.), AJ series alloys (e.g., Mg—Al—Sr alloys), AM series alloys (e.g., Mg—Al—Mn alloys such as AM20, AM50, AM60, etc.), AS series alloys (AS21, AS 41, etc.), AX series alloys (Mg—Al—Ca), AXJ series alloys (e.g., Mg—Al—Ca—Sr alloys), AZ series alloys (e.g., Mg—Al—Zn alloys such as AZ31, AZ6 µl, AZ80, AZ91, etc.), Elektron 21 series alloys (e.g., Mg—Gd—Nd—Zr alloys such as Elektron ZRE1, etc.), LPSO alloys (e.g., Mg—Zn—Re alloys, Mg—Zn—Y alloys, Mg—Zn—Dy alloys, Mg—Zn—Ho alloys, Mg—Zn—Er alloys, Mg—Zn—Tm alloys, Mg—Zn—Gd alloys, Mg—Zn—Tb alloys, etc.), QE series alloys (e.g., Mg—Ag—Nd—Zr alloys), WE series alloys (Mg—Y-RE), ZE series alloys (e.g., Mg—Zn—RE-Zr alloys such as ZE41, ZE 63, etc.), ZK series alloys (Mg—Zn—Zr), ZM5 series alloys (e.g., Mg—Al—Zn alloy), ZMS series alloys (Mg—Zn—Mn—Sn), or ZW series alloys (Mg—Zn—Y).

Another and/or alternative non-limiting objective of the present invention is the provision of a magnesium-based composite that has an improved hot tear strength as compared to magnesium or a magnesium alloy that is absent insoluble nanoparticle additions, and which magnesium-based composite can be die-cast and formed into complex thin-walled shapes.

Another and/or alternative non-limiting objective of the present invention is the provision of a magnesium-based composite wherein the insoluble nanoparticles can be formed ex situ and added to the magnesium or magnesium-based alloy while the magnesium or magnesium-based alloy is molten, using various methods to control wetting and dispersion of the insoluble nanoparticles in the molten magnesium or magnesium-based alloy.

Another and/or alternative non-limiting objective of the present invention is the provision of a magnesium-based composite wherein the insoluble nanoparticles can be formed in situ through addition of reactive species or alloying elements while the magnesium or magnesium-based alloy is in a molten state.

Another and/or alternative non-limiting objective of the present invention is the provision of a magnesium-based composite that can be subjected to deformation processing to have an tensile yield strength that is greater than about 35 ksi, and typically greater than about 45 ksi, while retaining significant ductility of more than 5%, and preferably more than 15% strain to failure.

Another and/or alternative non-limiting objective of the present invention is the provision of a magnesium-based composite that can be subjected to semi-solid processing such as thixomolding, thixocasting, continuous reheocasting, SIMA processing, and/or other processing techniques to further improve ductility of the material.

Another and/or alternative non-limiting objective of the present invention is the provision of a magnesium-based composite that can have a strain to failure exceeding about 15%, and preferably exceeds about 20%, compared to 3-14% for magnesium and magnesium alloy.

Another and/or alternative non-limiting objective of the present invention is the provision of a magnesium-based composite that can be annealed to create a desired microstructure (e.g., stable LPSO phases, alpha-beta microstructures, homogenous solid solutions, or uniform fine precipitates) prior to deformation processing.

Another and/or alternative non-limiting objective of the present invention is the provision of a magnesium-based composite that can retain excellent mechanical properties as-cast, with or without heat treatment, to include an elongation to failure above about 5%, and generally above about 10%.

Another and/or alternative non-limiting objective of the present invention is the provision of a magnesium-based composite that can have improved hot tear strength of about 10-15% as compared to magnesium or magnesium alloys that are absent insoluble nanoparticles.

Another and/or alternative non-limiting objective of the present invention is the provision of a magnesium-based composite that can also include galvanically-active phases that produce a controlled dissolution rate of the composite in the presence of tap water or brine or fracking liquid of 10-200 $Mg/cm^2$/hr. at a temperature of at least 55° C., typically at a temperature of at least 75° C., more typically at a temperature of at least about 90° C., and even more typically at a temperature of at least about 135° C.

Another and/or alternative non-limiting objective of the present invention is the provision of a magnesium-based composite that retains at least 70% of its room temperature (e.g., 25° C.) tensile strength properties at 150° C., and typically retains at least 85% of its room temperature tensile strength properties at 150° C.

Another and/or alternative non-limiting objective of the present invention is the provision of a magnesium-based composite that retains at least 70% of its room temperature mechanical properties at 185° C., and typically retains at least 70% of its room temperature mechanical properties at 200° C.

Another and/or alternative non-limiting objective of the present invention is the provision of a magnesium-based composite that retains an elongation to failure of at least 8% at 25° C.

Still yet another and/or alternative non-limiting objective of the present invention, there is provided a magnesium-based composite that can be used as a dissolvable, degradable and/or reactive structure in oil drilling. For example, the magnesium-based composite of the present invention can be used to form a frac ball or other structure in a well drilling or completion operation, such as a structure that is seated in a hydraulic operation, that can be dissolved away after use so that that no drilling or removal of the structure is necessary. Other types of structures can include, but are not limited to, sleeves, valves, hydraulic actuating tooling and the like. Such non-limiting structures or additional non-limiting structure are illustrated in U.S. Pat. Nos. 8,905,147; 8,717,268; 8,663,401; 8,631,876; 8,573,295; 8,528,633; 8,485,265; 8,403,037; 8,413,727; 8,211,331; 7,647,964; US Publication Nos. 2013/0199800; 2013/0032357; 2013/0029886; 2007/0181224; and WO 2013/122712, all of which are incorporated herein by reference.

Other objects, advantages, and novel features of the present invention will become apparent from the following detailed description of the invention when considered in conjunction with the accompanying drawings.

BRIEF DESCRIPTION OF THE DRAWINGS

FIG. 1 is a Plot of Maxwell Model calculation for ratio of magnesium-based composite thermal conductivity versus magnesium thermal conductivity for various particle sizes and loadings of diamonds (1500 W/m-K) from 20 to 400 micron in size.

FIG. 2 is a photograph of a tabletop ultrasonic casting unit for dispersing nanoparticles into magnesium.

DESCRIPTION OF THE INVENTION

Figure 3:
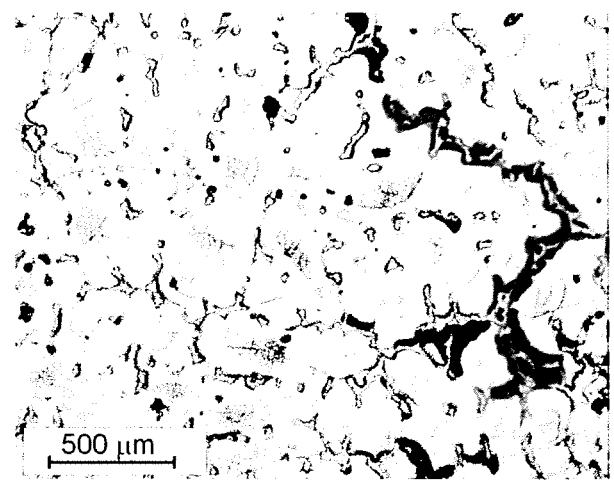
FIG. 3 is a photomicrograph of a typical AZ91 cast structure showing the Mg—Al primary (alpha) and the alpha plus gamma eutectic phases.

The present invention is directed to a cast or wrought magnesium-based composite incorporating nanoparticle modifiers, and method for manufacture of such magnesium-based composite. The magnesium-based composite has improved thermal, physical, and mechanical properties as compared to prior art magnesium alloys. The magnesium-based composite includes a modification of grain boundary thermal or sliding resistance through the addition of nanoscale fillers to the high strength magnesium alloys. The magnesium-based composite has a 15% or greater improvement in thermal conductivity, strength, or strain to failure compared to the base material.

The magnesium-based composite includes magnesium or a magnesium alloy having at least one insoluble phase in discrete form that is disbursed in the base metal or base metal alloy. The magnesium-based composite is generally produced by casting. The discrete insoluble particles include nanoparticles that have a different galvanic potential from the magnesium or a magnesium alloy. The discrete insoluble particles are generally uniformly dispersed through the magnesium or a magnesium alloy using techniques such as, but not limited to, thixomolding, stir casting, mechanical agitation, electrowetting, ultrasonic dispersion and/or combinations of these methods; however, this is not required. In one non-limiting process, the insoluble particles are uniformly dispersed through the magnesium or a magnesium alloy using ultrasonic dispersion. Due to the insolubility and difference in atomic structure in the melted magnesium or a magnesium alloy and the insoluble particles, the insoluble particles will be pushed to the grain boundary of the mixture of insoluble particles and the melted magnesium or a magnesium alloy as the mixture cools and hardens during casting solidification. Because the insoluble particles will generally be pushed to the grain boundary, such feature makes it possible to engineer/customize grain boundaries in the magnesium-based composite to control the dissolution rate of the magnesium-based composite. This feature can be also used to engineer/customize grain boundaries in the magnesium-based composite through traditional deformation processing (e.g., extrusion, tempering, heat treatment, etc.) to increase tensile strength, elongation to failure, and other properties in the magnesium-based composite that were not achievable in cast metal structures that were absent insoluble particle additions. Because the amount or content of insoluble particles in the grain boundary is generally constant in the magnesium-based composite, and the grain boundary to grain surface area is also generally constant in the magnesium-based composite even after and optional deformation processing and/or heat treatment of the magnesium-based composite, the corrosion rate of the magnesium-based composite remains very similar or constant throughout the corrosion of the complete magnesium-based composite.

The magnesium-based composite can be designed to corrode at the grains in the magnesium-based composite, at the grain boundaries of the magnesium-based composite, and/or the location of the insoluble particle additions in the magnesium-based composite depending on selecting where the insoluble particle additions fall on the galvanic chart. For example, if it is desired to promote galvanic corrosion only along the grain boundaries, a magnesium-based composite can be selected such that one galvanic potential exists in the base metal or base metal alloy where its major grain boundary alloy composition will be more anodic as compared to the matrix grains (i.e., grains that form in the casted base metal or base metal alloy) located in the major grain boundary, and then an insoluble particle addition will be selected which is more cathodic as compared to the major grain boundary alloy composition. This combination will cause corrosion of the material along the grain boundaries, thereby removing the more anodic major grain boundary alloy at a rate proportional to the exposed surface area of the cathodic particle additions to the anodic major grain boundary alloy. The current flowing in the grain boundary can be calculated by testing zero resistance current of the cathode to the anode in a solution at a desired solution temperature and pressure that includes the magnesium-based composite. Corrosion of the magnesium-based composite will be generally proportional to current density/unit area of the most anodic component in the grain boundary and/or grains until that component is removed. If electrical conductivity remains between the remaining components in the grain boundary, the next most anodic component in the grain boundary and/or grains will next be removed at a desired temperature and pressure.

Galvanic corrosion in the grains can be promoted in the magnesium-based composite by selecting a base metal or base metal alloy that has at least one galvanic potential in the operating solution of choice (e.g., fracking solution, brine solution, etc.) where its major grain boundary alloy composition is more cathodic as compared to the matrix grains (i.e., grains that form in the casted base metal or base metal alloy), and an insoluble particle addition is selected that is more cathodic as compared to the major grain boundary alloy composition and the base metal or base metal alloy. This combination will result in the corrosion of the magnesium-based composite through the grains by removing the more anodic grain composition at a rate proportional to the exposed surface area of the cathodic non-soluble particle additions to the anodic major grain boundary alloy. The current flowing in the magnesium-based composite can be calculated by testing zero resistance current of the cathode to the anode in a solution at a desired solution temperature and pressure that includes the magnesium-based composite. Corrosion of the magnesium-based composite will be generally proportional to current density/unit area of the most anodic component in the grain boundary and/or grains until that component is removed. If electrical conductivity remains between the remaining components in the grain boundary, the next most anodic component in the grain boundary and/or grains will next be removed at a desired temperature and pressure.

If a slower corrosion rate of the magnesium-based composite is desired, two or more insoluble particle additions can be added to the magnesium-based composite to be deposited at the grain boundary. If the second insoluble particle is selected to be the most anodic in the magnesium-based composite, the second insoluble particle will first be corroded, thereby generally protecting the remaining components of the magnesium-based composite based on the exposed surface area and galvanic potential difference between second insoluble particle and the surface area and galvanic potential of the most cathodic system component. When the exposed surface area of the second insoluble particle is removed from the system, the system reverts to the two previous embodiments described above until more particles of second insoluble particle are exposed. This arrangement creates a mechanism to retard corrosion rate with minor additions of the second insoluble particle component.

The rate of corrosion in the magnesium-based composite can also be controlled by the surface area of the insoluble particle. As such, the particle size, particle morphology, and particle porosity of the insoluble particles can be used to affect the rate of corrosion of the magnesium-based composite. The insoluble particles in the magnesium-based composite can optionally have a surface area of 0.001 $m^2/g$-200 $m^2/g$ (and all values and ranges therebetween). The insoluble particles in the magnesium-based composite optionally are or include non-spherical particles. The insoluble particles in the magnesium-based composite optionally are or include nanotubes and/or nanowires. The non-spherical insoluble particles can optionally be used at the same volume and/or weight fraction to increase cathode particle surface area to control corrosion rates without changing composition. The insoluble particles in the magnesium-based composite optionally are or include spherical particles. The spherical particles (when used) can have the same or varying diameters. Such particles are optionally used at the same volume and/or weight fraction to increase cathode particle surface area to control corrosion rates without changing composition.

The strength of the magnesium-based composite can optionally be increased using deformation processing and a change dissolution rate of the magnesium-based composite of less than about 20% (e.g., 0.01-19.99% and all values and ranges therebetween), typically less than about 10%, and more typically less than about 5%.

The ductility of the magnesium-based composite can optionally be increased using insoluble nanoparticle cathodic additions.

The magnesium-based composite can optionally include chopped fibers. These additions to the magnesium-based composite can be used to improve toughness of the magnesium-based composite.

The magnesium-based composite can have improved tensile strength and/or elongation due to heat treatment without significantly affecting the dissolution rate of the magnesium-based composite.

The magnesium-based composite can have improved tensile strength and/or elongation by extrusion and/or another deformation process for grain refinement without significantly affecting the dissolution rate of the magnesium-based composite. In such a process, the dissolution rate change can be less than about 10% (e.g., 0-10% and all values and ranges therebetween), typically less than about 5%, and more typically less than about 1%.

Particle reinforcement in the magnesium-based composite can optionally be used to improve the mechanical properties of the magnesium-based composite and/or to act as part of the galvanic couple.

The insoluble particles in the magnesium-based composite can optionally be used as a grain refiner, as a stiffening phase to the base metal or metal alloy (e.g., matrix material), and/or to increase the strength of the magnesium-based composite.

The insoluble particles can optionally be dispersed throughout the magnesium-based composite using ultrasonic means, by electrowetting of the insoluble particles, and/or by mechanical agitation.

The magnesium-based composite can optionally be used to form all or part of a device for use in hydraulic fracturing systems and zones for oil and gas drilling, wherein the device has a designed dissolving rate. The magnesium-based composite can optionally be used to form all or part of a device for structural support or component isolation in oil and gas drilling and completion systems, wherein the device has a designed dissolving rate.

High conductivity nanoparticles (e.g., carbon (carbon nanotubes and nano-diamond particles), copper etc.) can be added to the magnesium-based composite to increase thermal conductivity of the magnesium-based composite by 100% or more via segregation and concentration in the eutectic alpha plus gamma phase, as well as segregation to subgrain boundaries and other lattice defects.

By adding high conductivity nanoparticles (e.g., 0.507 vol. %), either ex situ (blending), or formed in situ (e.g., from Cu additions, Ag additions, etc.), a significant increase of the thermal conductivity of the magnesium-based composite can be achieved as compared to an alloy absent such additions. This same phenomenon is not observed in single-phase magnesium (e.g., pure magnesium), but only in multiphase alloys where segregation to the eutectic region and to the phase interfaces is observed.

The nanoparticles are selected from the group consisting of fullerenes (including multi-walled and single-walled carbon nanotubes, graphene, nanodiamonds, buckyballs); inert ceramics, including submicron and nanoparticles (including nanotubes, platelets, and flakes) of W, SiC, AlN, BeO, BN; and/or $TiB_2$, high thermal conductivity MAX phase materials; and/or Cu, Ag, Al, Be, and/or Au compounds. At least about 30% of the nanoparticles generally have dimensions of less than about 200 nm. The nanoparticles generally constitute about 0.1-15 vol. % of the magnesium-based composite. The nanoparticles generally have at least one dimension below about 400 nm, and at least about 30% of the nanoparticles generally have dimensions of less than about 200 nm. The nanoparticles generally have a thermal conductivity of greater than about 140 W/m-K.

The micron-sized particles (when used) can include one or more materials selected from the group consisting of diamond; heat-treated carbon fiber; SiC particles, fibers or whiskers; heat-treated graphite; AlN; BN; and/or other high thermal conductivity, thermally-stable material. The size of the micron-sized particles (when used), is about 10-300 microns, and the micron-sized particles generally have a high thermal conductivity that is greater than about 180 W/m-K. The micron-sized particles (when used), constitute about 1-45 vol. % of the magnesium-based Example 1

An AZ91D magnesium alloy having 9 wt. % aluminum, 1 wt. % zinc and 90 wt. % magnesium was melted to above 700° C. About 2 vol. % nano iron particles and about 2 vol. % nano graphite particles were added to the AZ91D magnesium alloy using ultrasonic mixing. The melt was cast into steel molds. The iron particles and graphite particles did not fully melt during the mixing and casting processes. The material dissolved at a rate of 2 mg/cm²-min in a 3% KCl solution at 20° C. The material dissolved at a rate of 20 mg/cm²-hr in a 3% KCl solution at 65° C. The material dissolved at a rate of 100 mg/cm²-hr in a 3% KCl solution at 90° C. The dissolving rate of magnesium-based composite for each these test was generally constant.

Example 2

Carbon nanotubes and/or finely divided copper nanoparticle powder were added to pure magnesium and an AZ91 magnesium alloy (having 9 wt. % aluminum, 1 wt. % zinc and 90 wt. % magnesium) when in molten form. The AZ91 magnesium alloy was melted to above 700° C. Insoluble nanoparticles in the form of carbon nanotubes (multiwall, high thermal conductivity) were added to the molten AZ91 magnesium alloy. The insoluble carbon nanotubes were added by consolidating the carbon nanotubes into a magnesium rod by mechanically blending the carbon nanotubes with magnesium powder and then cold pressing the mixture of carbon nanotubes and magnesium powder into a rod. The rod containing the carbon nanotubes was fed/inserted into the molten AZ91 magnesium alloy. The insoluble carbon nanotubes were dispersed in the molten AZ91 magnesium alloy by ultrasonic mixing wherein the rod was directed into the ultrasonic sweet spot to melt the rod at a melt temperature of 700° C. The carbon nanotubes constituted about 3 vol. % of the formed magnesium-base composite. The average particle size of the carbon nanotubes was less than 300 nm.

The copper nanoparticle powder was added to the molten AZ91 magnesium alloy by consolidating the copper nanoparticle powder with magnesium powder and then cold pressing the mixture of copper powder and magnesium powder into a rod. The rod containing the copper nanoparticle powder was fed/inserted into the molten AZ91 magnesium alloy. The insoluble copper nanoparticle powder was dispersed in the molten AZ91 magnesium alloy by ultrasonic mixing wherein the rod was directed into the ultrasonic sweet spot to melt the rod at a melt temperature of 700° C. The copper nanoparticles constituted about 3 vol. % of the formed magnesium-base composite. The average particle size of the copper nanoparticles was less than 300 nm. When both carbon nanotubes and copper nanoparticles were added, the carbon nanotubes constituted about 2 vol. % of the formed magnesium-base composite and the copper nanoparticles constituted about 2 vol. % of the formed magnesium-base composite.

A 10 lb. casting of the magnesium-based composite in accordance with Example 2 was prepared in a steel permanent mold having a 3" diameter. After casting, the cast materials were extruded into ½" rods for mechanical and thermal testing at an extrusion temperature of about 340° C. Table I illustrates the results of the Mg-CNT, AZ91-CNT and AZ91-Cu-CNT composites formed in accordance with the present invention as compared with casting formed of pure magnesium and AZ91 magnesium alloy.

TABLE 1

Comparative Results of Magnesium-Based Composite

| Material | Thermal Conductivity | Ultimate Tensile Strength (ksi) | Tensile Yield (ksi) |
|---|---|---|---|
| Mg | 156 | 27.1 | 14.7 |
| AZ91 | 108 | 49.5 | 41.7 |
| Mg—Cu | 179 | 38.4 | 35.5 |
| Mg-CNT | 89 | 35.5 | 26.8 |
| AZ91-CNT | 204 | 49.8 | 41.9 |
| AZ91-Cu-CNT | 271 | 52.3 | 44.6 |

The results in Table 1 illustrate that the AZ91-CNT and AZ91-Cu-CNT composites had a greater thermal conductivity, tensile strength, and yield strength than the pure magnesium and AZ91 magnesium alloy that was absent the nanoparticle additions. The Mg-CNT composite had a thermal conductivity that was less than the thermal conductivity of pure magnesium, but had a greater tensile strength and yield strength than pure magnesium.

Alternative alloy systems developed that demonstrate the mechanical property improvements and propensity for high thermally and electrically conductive magnesium-based composites were researched. These alloys were formed in a similar manner as the alloy of Example 2. The AZ91 magnesium alloy was substituted for magnesium alloys of AXM4304, AX50, ZMS616, WEK430, ZWK120, ZWE111 and ZWEK1450.

These alloys were also developed as 10 lb. castings, but cast into 1" and 2" ingot sizes. After casting, the parts were extruded into <½" rods for mechanical characterization using an 8:1 extrusion ratio and varying extrusion processing parameters. The ZMS alloys were also put through a double-aging process post extrusion and the LPSO phase alloys were solution treated prior to extrusion.

TABLE 2

Mechanical Properties of Alternative Alloy Systems

| Material | Tensile Ultimate (ksi) | Tensile Yield (ksi) | Elongation to failure (%) |
|---|---|---|---|
| AXM4304 | 50.5 | 43.6 | 3.5 |
| AX50 | 38.1 | 23.6 | 18 |
| ZMS616 | 50.5 | 47.1 | 11 |
| WEK430 | 33.3 | 21.3 | 15 |
| ZWK120 | 34.5 | 22.0 | 20 |
| ZWE111 | 32.3 | 18.7 | 25 |
| ZWEK1450 | 38.5 | 22.1 | 18 |

FIG. 1 is a Plot of Maxwell Model calculation for ratio of magnesium-based composite thermal conductivity versus magnesium thermal conductivity for various particle sizes and loadings of diamonds (1500 W/m-K) from 20 to 400 micron in size. FIG. 1 illustrates that at least 60 microns are needed to have significant effect due to interface resistance between electron conductor (Mg, metal), and phonon conductor (carbon, ceramic, intermetallic, diamond). FIG. 1 also illustrates that the addition of fine particles as a well-mixed composite into the magnesium or other light alloys (aluminum, etc.) leads to a reduction or no change in thermal performance of the magnesium-based composite.

FIG. 2 is a photograph of a tabletop ultrasonic casting unit for dispersing nanoparticles into magnesium. This unit can be used to obtain an initially uniform dispersion in a single-phase molten metal mixture of nanoparticles and dispersoids. Typically, this is done under various degrees of superheat, from about 675-725° C. for magnesium, or from 25-150° C. degrees of superheat, and typically from about 50-100° C. degrees of superheat for light metals.

FIG. 3 is a photomicrograph of a typical AZ91 cast structure showing the Mg—Al primary (alpha) and the alpha plus gamma eutectic phases. Segregation of ex situ- and in situ-added high conductivity particulates to the subgrain boundaries and eutectic liquid resulted in elimination of microstructural defects and an enhancement of strength and conductivity of the interfacial and interphasic regions.

Figure 4:
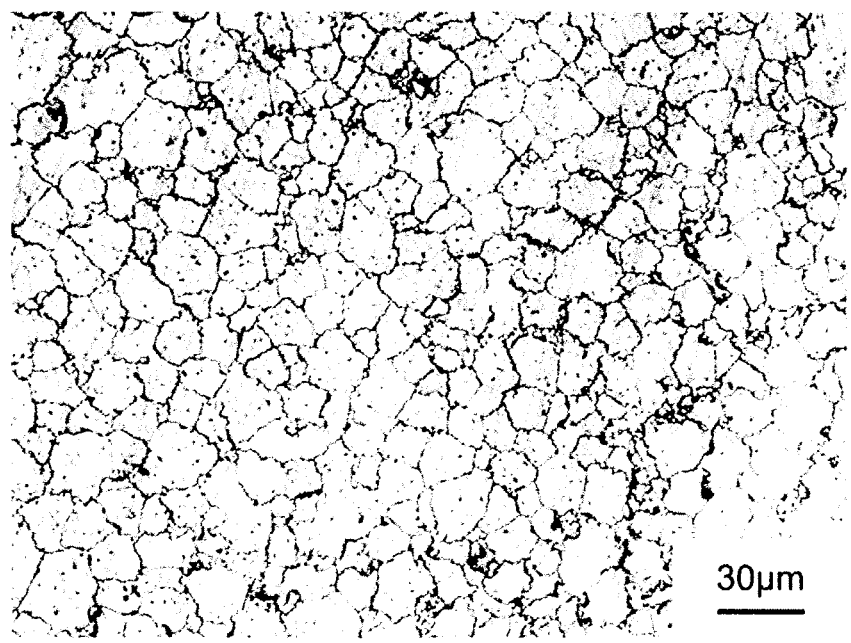
FIG. 4 is a photomicrograph of a rapidly quenched AZ91 showing the uniform distribution of the eutectic along primary alpha grain boundaries.

FIG. 4 is a photomicrograph of a rapidly quenched AZ91 showing the uniform distribution of the eutectic liquid along primary alpha grain boundaries. By changing solidification and nucleating grains more homogenously, or through the use of other techniques, a more uniform distribution of the eutectic liquid can be obtained; thus, alloying lower concentrations of additives can be used to achieve the desired results in accordance with the present invention.

Figure 5:
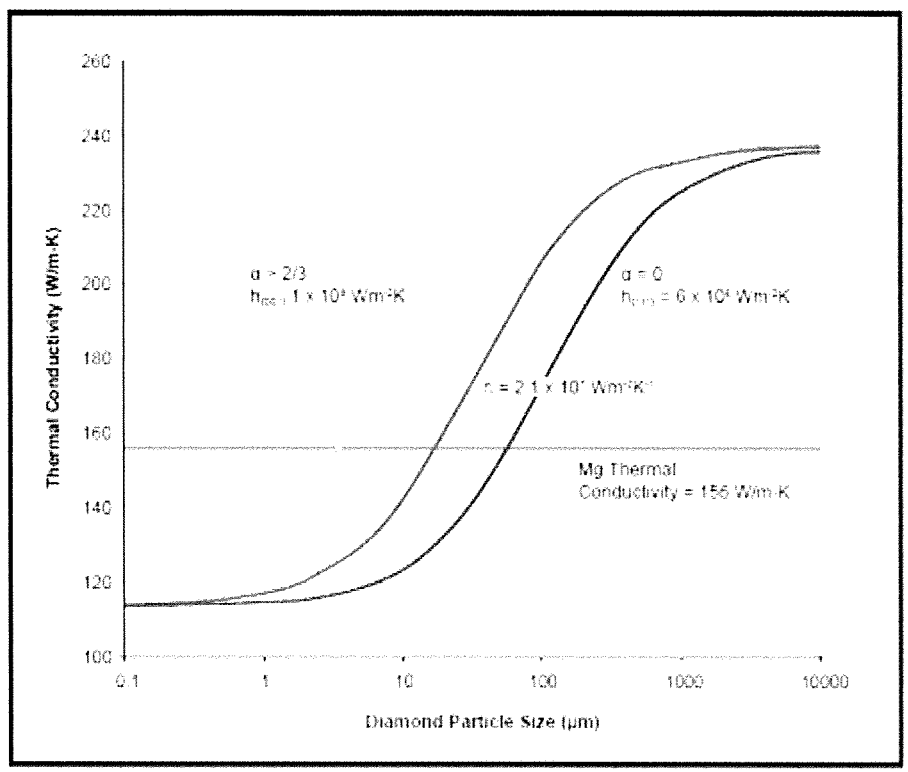
FIG. 5 is a graph illustrating thermal conductivity of the magnesium-based composite verses the particle size of the nanodiamond particles in the magnesium-based composite.
Figure 6:
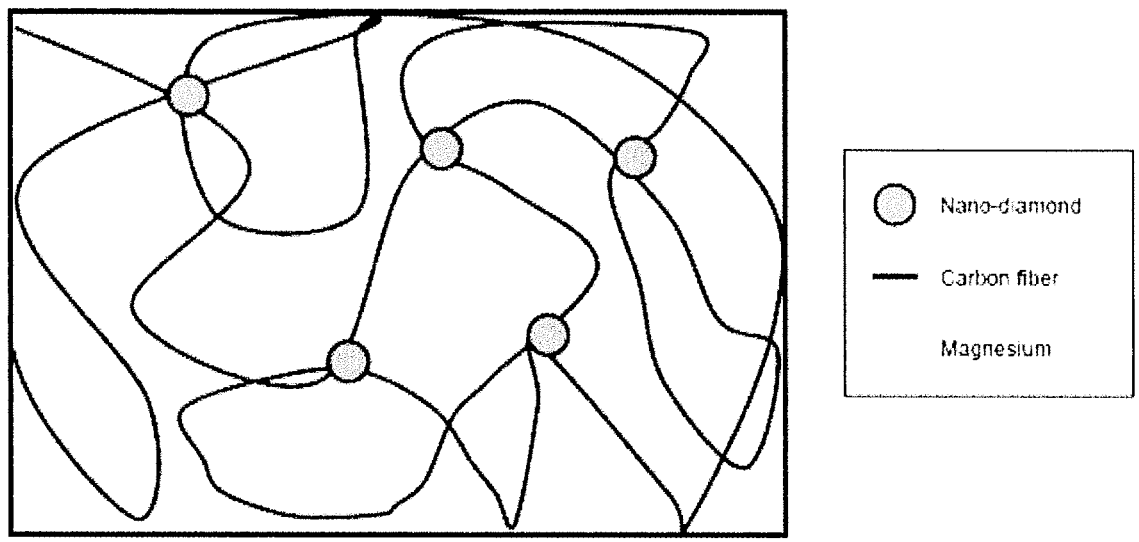
FIG. 6 is an illustration of the microstructure of a Mg-CNT composite.

It is surmised that the next generation of missile airframes and spacecraft thermal management systems could be designed using a magnesium-based composite with the combination of the lowest density, highest thermal conductivity, and highest strength. The cast or wrought magnesium-based composite incorporating nanoparticle modifiers can be formed by a highly scalable, low cost process that advances the state-of-the-art of metal matrix thermal conductors to reach a theoretical goal of 578 W/mK (up to 270 W/mK achieved), a density less than aluminum (1.7 g·cc achieved), and a yield strengths over 30 ksi ($\approx$207 MPa, 42 KSI achieved at 8:1 extrusion ratio). The addition of high conductivity reinforcements is limited due to interfacial resistance, requiring large particles to achieve significant improvements. Thermal conductivity of the magnesium-based composite versus diamond particle size (Type I, k=1500 w/m-K) is illustrated in FIG. 5. The system is a magnesium-diamond system that includes 20 vol. % diamonds. By adding high conductivity nanofibers in accordance with the present invention, interfacial resistances can be reduced or eliminated. This concept is illustrated in FIG. 6, illustrating the high conductivity phases connected with "short circuit" nanotubes. FIG. 6 is an illustration of the microstructure of a Mg-CNT composite. In the past, the incorporation of high conductivity carbon nanofibers into metals and the production of highly grain-refined metals (nanostructured metals) has been found to improve mechanical and thermal properties of materials, with limited technical and commercial success. The majority of these efforts have focused on powder metallurgy solid state approaches, which are expensive and have poor scalability, not to mention significant safety concerns in magnesium alloys. The present invention focuses on enabling the production of metal matrix nanocomposites through advanced dispersion casting techniques, combining the production of engineered nanocomposite feedstocks with the addition of acoustic and mechanical energy to control nanophase dispersion and chemistry.

Figure 7:
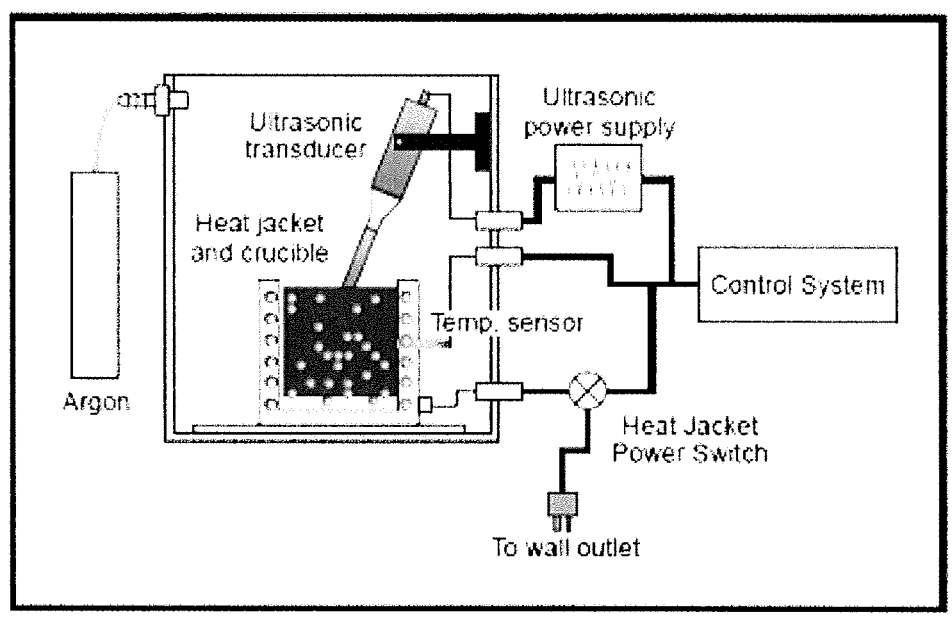
FIG. 7 illustrates an ultrasonication process to disperse nanoparticles in molten metal magnesium material.

The problem of incorporating high-aspect-ratio, high-surface-area particles (including fiber and flake) with controlled and repeatable concentration and distribution into molten metals is a large undertaking, and must factor in the molten metal temperature, composition, and surface tension as well as particle surface area, reactivity, clustering, segregation, and temperature and time-dependent wetting phenomena. Direct feeding of the low-density high-surface-area particles into the melt does not work, as particles burn, float, react with the molten metal, or do not stay in the metal. Other feeding mechanisms attempted in the past (such as auger feeding into the metal, in situ formation, and stir casting) are cost prohibitive and not always scalable. To solve these problems, high-aspect-ratio nanoparticles (carbon nanofibers) in accordance with the present invention are incorporated into a pre-dispersed master-composite that enables safe and reliable feeding into molten magnesium to create a high-strength, high thermal-conductivity magnesium-based composite. As illustrated in FIG. 7, the process can be based on ultrasonication technologies with nanoparticle surface chemistry control to disperse nanoparticles into a metal-compatible binder that can be formed into controlled density pellets or rods similar to grain refiners used commercially. These pellets or rods can be directly inserted into a pool of molten metal. Without fabrication of these magnesium-based composites, the nanoparticles agglomerate at the surface of the molten metal, being burned or removed from the casting with slag, instead of being incorporated into the nanocomposite. The method has resulted in both strength increase (>50%) and improvement in thermal conductivity (>150%) in magnesium using multi-walled carbon nanotubes incorporated at low volume fractions into high strength castable/wrought magnesium alloys. These low-cost methods of achieving high-strength, high-conductivity magnesium-based composites using casting techniques have now been demonstrated, leading to an exceptional balance of properties and cost not achievable in currently available alloys or materials.

Figure 8:
FIG. 8 is a picture of the addition of nanoparticles to a molten magnesium alloy.

After preparation of the master alloy, the high concentration nanocomposites were added to magnesium alloy melts using stircasting in 10 lb melts and a flux cover as illustrated in FIG. 8. The master alloy was fabricated into rods, which were thrust below the flux cover manually, and mixed using a steel stirring rod. The degree of superheat and mixing procedures were optimized through iterative development to obtain a good dispersion. After casting, ingots were extruded at ratios of 4-12:1, as well as roll-reduced to improve mechanical properties and to improve ductilities from the cast structures. A 175-ton press was used, and extrusion temperatures of 300-400° C. were used to further process the ingots.

Figure 9:
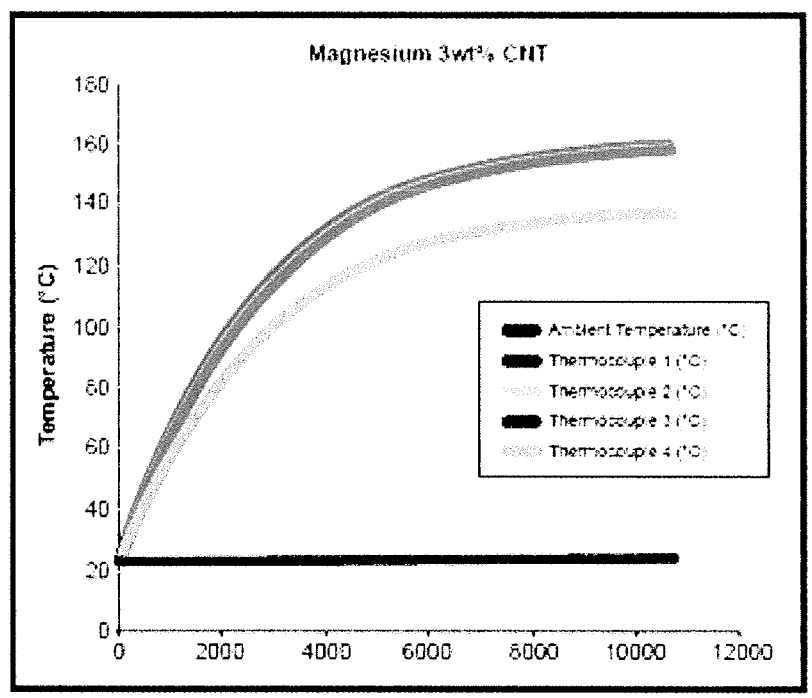
FIG. 9 is graph illustrating time-temperature curves generated for diffusivity measurement of a magnesium component containing 3 wt. % CNT.
Figure 10:
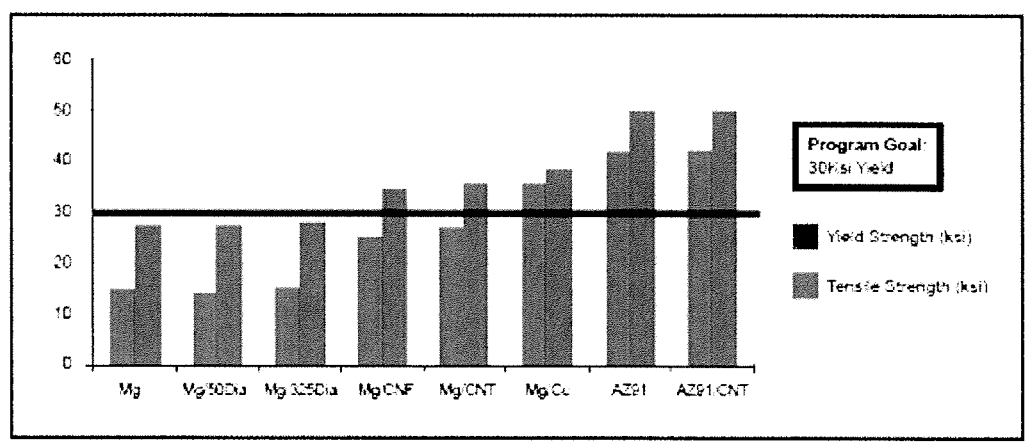
FIG. 10 is a graph illustrating tensile yield strengths for magnesium, magnesium alloys and magnesium-based composites that include nanoparticles.

Thermal and mechanical testing were completed as a function of nanotube loading, alloy composition, and high conductivity filler loading. A steady state vacuum thermal chamber was used for thermal diffusivity measurement, calibrated to an aluminum baseline. FIG. 9 illustrates time-temperature curves generated for diffusivity measurement. Measured conductivities, depending on alloy composition, diamond and CNT compositions ranged from 145 W/m-K (Mg is 156), to 204-270 W/m-K (depending on alloy). 204 W/m-k was achieved at low CNT loadings in a low cost AZ91 alloy matrix, a nearly 100% increase in conductivity. Strengths of wrought alloys were maintained or slightly improved in the magnesium-based composites, as illustrated in FIG. 10. FIG. 10 illustrates tensile yield strengths for high conductivity magnesium-based composite in accordance with the present invention. Interestingly, the addition of CNT's significantly increased the elongation to failure in magnesium alloys over equivalently processed pure alloy.

The production of wrought magnesium-based composite is highly scalable. The magnesium-based composite can be cast into cast billets and extruded to form a rod product which can be used for the production of magnesium frac balls in widespread use in the oil and gas industry.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A method for forming a magnesium-based composite comprising:
   providing a base metal formed of a magnesium or magnesium alloy;
   providing a plurality of nanoparticles, said nanoparticles having a thermal conductivity that is greater than said magnesium or magnesium alloy; said nanoparticles having a thermal conductivity of greater than 180 W/m-K; said nanoparticles having a particle size of no more than 400 μm;
   heating said base metal until molten;
   mixing said plurality of nanoparticles in said molten base metal to form a mixture and to cause said plurality of said nanoparticles to disperse in said mixture; and,
   cooling said mixture to form said magnesium-based composite;
   wherein said nanoparticles are located within 200 nm of grain boundaries or dislocations in said magnesium-based composite, said nanoparticles constitute at least 0.1 vol. % of said magnesium-based composite, said magnesium-based composite have a thermal conductivity of greater than 180 W/m-K, said nanoparticles cause said magnesium-based composite to have at least a 10% increase in thermal conductivity as compared to said thermal conductivity of said base metal.

2. The method as defined in claim 1, wherein said nanoparticles include a plurality of particles selected from the group consisting of carbon, graphene, diamond, copper, silver, aluminum, beryllium, gold, tungsten, SiC, AlN, BeO, BN, and $TiB_2$.

3. The method as defined in claim 2, wherein said step of mixing includes ultrasonic dispersion.

4. The method as defined in claim 3, wherein said nanoparticles constitute about 0.1-49.5 vol. % of said magnesium-based composite.

5. The method as defined in claim 4, wherein said nanoparticles constitute about 0.1-15 vol. % of said magnesium-based composite.

6. The method as defined in claim 5, wherein at least 30% of said nanoparticles have an average particle size or have at least one dimension that is no more than about 200 nm.

7. The method as defined in claim 6, wherein said base metal is a magnesium alloy selected from the group consisting of AM series alloy, AZ series alloy, and ZK series alloy.

8. The method as defined in claim 7, wherein said nanoparticles include copper and/or carbon nanotubes.

9. The method as defined in claim 1, wherein said step of mixing includes ultrasonic dispersion.

10. The method as defined in claim 1, wherein said nanoparticles constitute about 0.1-49.5 vol. % of said magnesium-based composite.

11. The method as defined in claim 1, wherein at least 30% of said nanoparticles have an average particle size or have at least one dimension that is no more than about 200 nm.

12. The method as defined in claim 1, wherein said base metal is a magnesium alloy selected from the group consisting of AM series alloy, AZ series alloy, and ZK series alloy.

13. The method as defined in claim 1, wherein said nanoparticles include copper and/or carbon nanotubes.

\* \* \* \* \*